US010983992B1

(12) United States Patent
Ferez Lafon et al.

(10) Patent No.: US 10,983,992 B1
(45) Date of Patent: Apr. 20, 2021

(54) AUTOMATICALLY STORING RECORDS GENERATED BY USERS BASED ON SCHEDULED RECURRING EVENT INFORMATION

(71) Applicants: Antonio Ferez Lafon, Cuauhtémoc (MX); Rodolfo Fierro, Oakland, CA (US)

(72) Inventors: Antonio Ferez Lafon, Cuauhtémoc (MX); Rodolfo Fierro, Oakland, CA (US)

(*) Notice: Subject to any disclaimer, the term of this patent is extended or adjusted under 35 U.S.C. 154(b) by 0 days.

(21) Appl. No.: 17/118,067

(22) Filed: Dec. 10, 2020

(51) Int. Cl.
*G06F 16/23* (2019.01)
*G06F 3/0482* (2013.01)
*G06F 9/54* (2006.01)

(52) U.S. Cl.
CPC ........ *G06F 16/2379* (2019.01); *G06F 3/0482* (2013.01); *G06F 9/541* (2013.01)

(58) Field of Classification Search
CPC ..... G06F 16/2379; G06F 3/0482; G06F 9/541
See application file for complete search history.

(56) References Cited

U.S. PATENT DOCUMENTS

| | | | | |
|---|---|---|---|---|
| 2005/0050064 A1* | 3/2005 | Klein | ..................... | G06F 16/273 |
| 2006/0265249 A1* | 11/2006 | Follis | ..................... | G16H 15/00 705/3 |
| 2009/0307043 A1* | 12/2009 | Cholewinski | ........ | G06Q 10/109 705/7.22 |
| 2012/0191724 A1* | 7/2012 | Tucek | ..................... | G06F 16/27 707/747 |
| 2014/0118465 A1* | 5/2014 | Scott | ..................... | H04M 3/436 348/14.03 |
| 2016/0286327 A1* | 9/2016 | Marten | ................ | H04R 29/008 |
| 2020/0142407 A1* | 5/2020 | Kozloski | .............. | G05D 1/0223 |

* cited by examiner

*Primary Examiner* — Etienne P Leroux
(74) *Attorney, Agent, or Firm* — Adibi IP Group, PC; Amir V. Adibi; Andrew C. Palmer

(57) ABSTRACT

Digital records are automatically sorted and stored based on scheduled recurring events. In one embodiment, a device stores schedule information having one or more time intervals associated with recurring events. A record is generated using the device, including one or more audio, text, video, image, or other digital media. After the record is generated, a storage location for the record is determined based on when the record was created. A creation time of the record is compared to the time intervals in the schedule information until a matching time interval is found. The matching time interval has an associated directory into which the record is stored. The directory stores other records associated with the recurring event. All records for the recurring event are readily available by accessing the directory. New records are automatically stored based on the schedule information. No time is spent storing, sorting, or organizing new records.

18 Claims, 26 Drawing Sheets

AUTOMATIC SORTING AND STORING OF COLLECTED
DATA BASED ON SCHEDULED RECURRING EVENTS

AUTOMATIC SORTING AND STORING OF COLLECTED
DATA BASED ON SCHEDULED RECURRING EVENTS

TIME BASED AUTOMATIC RECORD FILING
SOFTWARE APPLICATION

INITIALIZE APPLICATION

SCHEDULE INFORMATION CONFIGURATION
INTERFACE

CONFIGURE TIME INTERVAL FOR RECURRING EVENT

DASHBOARD INTERFACE

RECORD OPTIONS SELECT INTERFACE

GENERATE RECORD

SUBDIRECTORIES WITHIN EVENT DIRECTORY

CONFIGURE TIME INTERVAL FOR ANOTHER RECURRING EVENT

INTERFACE WHEN OUTSIDE OF TIME INTERVAL

DATE DIRECTORIES FOR SUBJECT

CALENDAR VIEWER

AUTOMATICALLY STORING RECORDS GENERATED BY USERS BASED ON SCHEDULED RECURRING EVENT INFORMATION

TECHNICAL FIELD

The present invention relates generally to software applications, and more specifically, to automated record keeping systems.

BACKGROUND INFORMATION

Records are commonly stored in electronic format as digital records. As more devices become readily available to consumers, digital records tend to span across various devices and storage locations. Cloud storage options are one popular technique for storing digital records across multiple devices. Typical cloud storage services are provided via subscription in which a user pays a subscription service fee and is granted an interface to the cloud storage service on multiple devices. The user is able to access files and directories across multiple devices, including mobile phones, tablets, and laptops, so long as the devices are connected to a network and have access to the cloud storage service. This is particularly advantageous to the user because the user is able to access files remotely regardless of which device they are presently using. Files owned by the user are accessible across all of their various devices.

SUMMARY

A device comprises a controller, an input/output interface, a memory, and a data bus. The memory comprises an amount of computer-readable instructions, schedule information, and a record storage data structure. The software application operates to receive schedule information and store records in accordance with the schedule information. The schedule information stores one or more time intervals associated with recurring events. The schedule information is received onto a scheduling interface provided by the software application. The record storage data structure stores digital records in an organized fashion according to the schedule information.

In operation, a record is received onto the input/output interface. The record comprises text, drawings, audio, video, images, or any data generated from user input. After receiving the record, the software application determines a storage location for the record based on when the record was generated. A creation time of the record is compared to the time intervals in the schedule information until a matching time interval is found. The matching time interval has an associated directory into which the record is stored. The directory is part of a record storage data structure stored within the memory. The directory stores other records associated with the recurring event.

Retrieval of records is highly efficient as compared to prior known techniques. This is due in part to the organized fashion in which received records are sorted and stored by the software application. The software application performs sorting and storing of records based on schedule information without any user input or human intervention. The novel application allows the user to maintain organization of records without needing to identify the records and move the records into desired directories.

When the user desires to view records for an associated event, the software application presents records on a display of the device. Records are presented together in a grouped fashion based on time intervals within the schedule information. This novel grouping and presentation of stored records ensures faster retrieval and review of stored data. No time is spent searching for stored records for a particular event. No time is spent searching across multiple devices for stored records for a particular event.

Using conventional techniques, the user would need to locate the directory and move the record to a directory by using an input device. Moving records consumes at least five seconds, but more often consumes at least between twenty and thirty seconds. These time costs are significant given the volume of records generated and the limited time most users have available. In fact, moving records can take several minutes if the user is unaware of when the record was created or where the record is located. Sometimes records are even lost indefinitely and not found. On the other hand, the novel software application and techniques taught in various embodiments disclosed herein automatically store records based on time of creation and based on the user's schedule. These innovative teachings save the user significant time that would otherwise be involved in maintaining and organizing records. Accordingly, the various novel disclosed embodiments yield significant technical advancements in record storage and retrieval.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
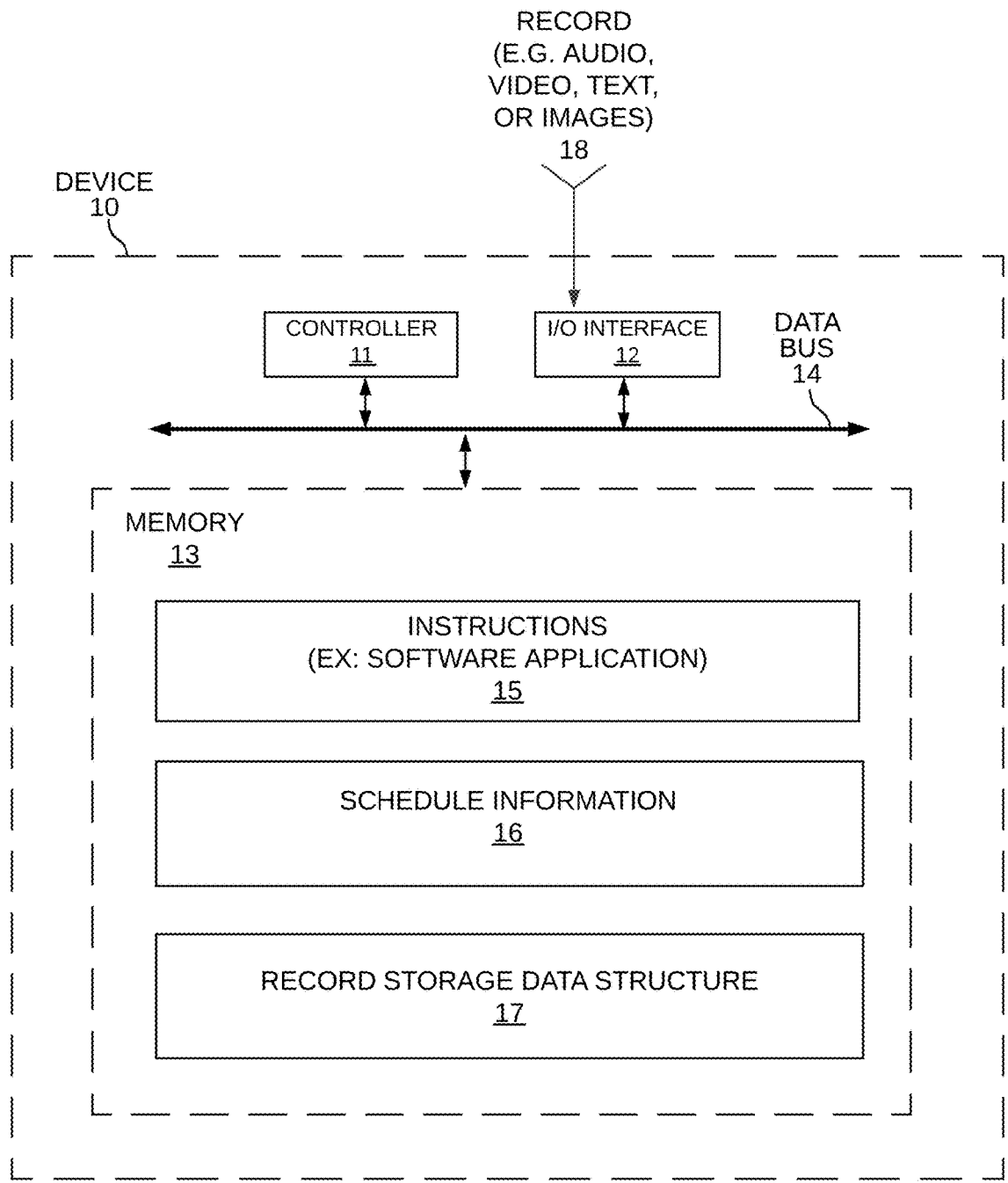
FIG. 1 is a diagram of a device 10.

FIG. 1 is a diagram of a device 10. The device 10 uses one or more recurrent scheduled events to automatically sort and store collected data based on date and time the data is collected. Collected data is stored based on schedule information without any human intervention. The collected data is quickly and easily retrievable by a user. The device 10 is any computing device capable of creating and/or storing a digital record. In one embodiment, the device is a computing device selected from the group consisting of: a computer, a laptop, a mobile phone, a tablet, a smartwatch, an Internet of Things (IoT) device, a virtual assistant, smartglasses, or any device operable to generate or store a digital record. A digital record is any data that is storable on a storage medium and includes images, audio, graphics, video, text, and other data generated by user input. Digital records include files having different file extensions.

The device 10 comprises a controller 11, an input/output interface 12, a memory 13, and a data bus 14. The memory 13 comprises an amount of computer-readable instructions 15, schedule information 16, and a record storage data structure 17. The controller 11 is any suitable processor capable of interpreting or executing instructions. The input/output interface 12 is any suitable hardware capable of interfacing with input or output devices, such as cameras, microphones, touch displays, and keyboards. The memory 13 is a computer-readable medium that includes any kind of computer memory such as floppy disks, conventional hard disks, CD-ROMS, Flash ROMS, non-volatile ROM, RAM, and non-volatile memory. The controller 11 reads instructions 15 from memory 13 over data bus 14. In another embodiment, the memory 13 is external to the device 10, such as a cloud-based service, and the controller 11 accesses the memory 13 over a network. In this embodiment, the instructions 15 are a software application. The software application operates to receive schedule information and store records in accordance with the schedule information.

The schedule information 16 stores one or more time intervals associated with recurring events. The schedule information 16 is received onto a scheduling interface provided by the software application 15. The record storage data structure 17 stores digital records in an organized fashion according to the schedule information 16.

In operation, a record 18 is received onto the input/output interface 12. The record 18 comprises text, drawings, audio, video, images, or any data generated from user input. After receiving the record 18, the software application 15 determines a storage location for the record 18 based on when the record 18 was generated. The software application 15 stores the record 18 within the record storage data structure 17 of the memory 13. In this embodiment, the record 18 is generated using the software application 15.

Retrieval of records, such as record 18, is highly efficient as compared to prior known techniques. This is due in part to the organized fashion in which received records are sorted and stored by the software application 15. In response to detecting that a user desires to view records for an associated event, the software application 15 presents records on a display of the device 10. Presented records are grouped together based on time intervals within the schedule information 16. This novel grouping and presentation of stored records ensures faster retrieval and review of stored data.

Figure 2:
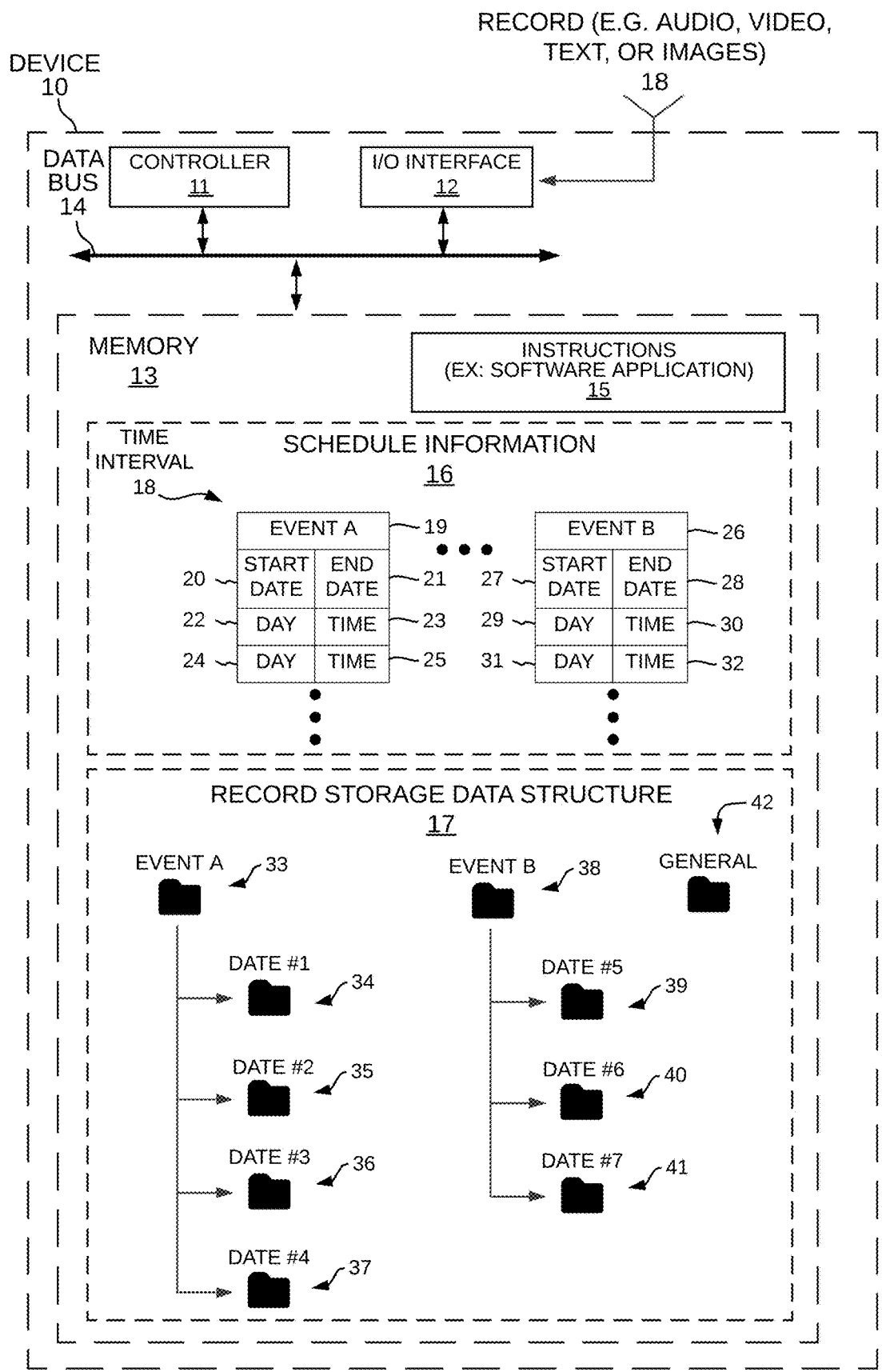
FIG. 2 is a detailed diagram of the schedule information 16 and the record storage data structure 17.

FIG. 2 is a detailed diagram of the schedule information 16 and the record storage data structure 17. The schedule information 16 includes one or more time intervals. The time intervals indicate when a recurring event or note-taking activity is conducted. Each record stores information recorded during the recurring event activity or note-taking activity. In this embodiment, each time interval of the schedule information 16 includes a start date, an end date, and at least one recurring time and day of a week. Reference numeral 18 identifies various time intervals within the schedule information 16.

In the example of FIG. 2, schedule information 16 includes time interval information for recurring events 19 (EVENT A) and 26 (EVENT B). The recurring event 19 (EVENT A) has a start date 20 and an end date 21. The recurring event 19 (EVENT A) occurs on a weekday 22 during a time period 23 and occurs on another weekday 24 during a time period 25. All records having creation times within time interval 22 and 23 and within time interval 24 and 25 will be stored in a storage location associated with recurring event 19 (EVENT A). The recurring event 26 (EVENT B) has a start date 27 and an end date 28. The recurring event 26 (EVENT B) occurs on a weekday 29 during a time period 30 and occurs on another weekday 31 during a time period 32. All records having creation times within time interval 29 and 30 and within time interval 31 and 32 will be stored in a storage location associated with recurring event 26 (EVENT B).

In this example, instructions 15 form part of a software application. In operation, the software application 15 determines a storage location for records based on the schedule information 16. Each record has a creation time or timestamp associated with when the record was generated. The software application 15 determines storage location for a record by comparing the creation time of the record with time intervals of the schedule information. The storage location stores other records having creation times within time intervals associated with the recurring event.

The record storage data structure 17 includes various storage locations in which records are to be stored. Records that match a time interval within the schedule information 16 are stored in the storage location associated with the event. The storage location is determined by comparing a creation time of the record with each time interval until a matching time interval in the schedule information is found.

In this example, the record storage data structure 17 includes an Event A directory 33, an Event B directory 38, and a General directory 42.

The Event A directory 33 is a storage location that stores all records associated with recurring event 19 (EVENT A). Records having creation times within start date 20 and end date 21 and within either time interval 22 and 23 or interval 24 and 25 are stored within Event A directory 33 or within a subdirectory of Event A directory 33. In this example, Event A directory 33 includes a DATE #1 subdirectory 34, a DATE #2 subdirectory 35, a DATE #3 subdirectory 36, and a DATE #4 subdirectory 37. The label "DATE #1" indicates a date in which all records recorded within time intervals of recurring event 19 (EVENT A) are stored on that date. In other embodiments, there are no subdirectories and all records associated with recurring event 19 (EVENT A) are stored within the Event A directory 33.

The Event B directory 38 is a storage location that stores all records associated with recurring event 26 (EVENT B). Records having creation times within start date 27 and end date 28 and within either time interval 29 and 30 or interval 31 and 32 are stored within Event B directory 38 or within a subdirectory of the Event B directory 38. In this example, the Event B directory 38 includes a DATE #5 subdirectory 39, a DATE #6 subdirectory 40, and a DATE #7 subdirectory 41. In other embodiments, there are no subdirectories and all records associated with recurring event 26 (EVENT B) are stored within the Event B directory 38.

The General directory 42 is a storage location that stores all records that are not directly associated with a recurring event within schedule information 16. In one embodiment, if a record is received that is outside of a time interval within the schedule information 16, then a user is presented with a prompt as to where they wish to store the record. The General directory 42 is presented as an option for storage. In another embodiment, the General directory 42 is a catchall directory for records having creation times that do not match a time interval within schedule information 16 and is selected as the storage location without further user input.

In the embodiment shown in FIG. 2, the record storage data structure 17 is part of the memory 13 and is local to device 10. In other embodiments, the record storage data structure 17 is stored externally. In the embodiment shown in FIG. 2, the schedule information 16 is part of the memory 13 and is local to device 10. In other embodiments, the schedule information 16 is stored externally. For example, in another embodiment, the schedule information 16 is obtained from a calendar application configured to communicate with the software application 15 through an Application Programming Interface (API).

Figure 3:
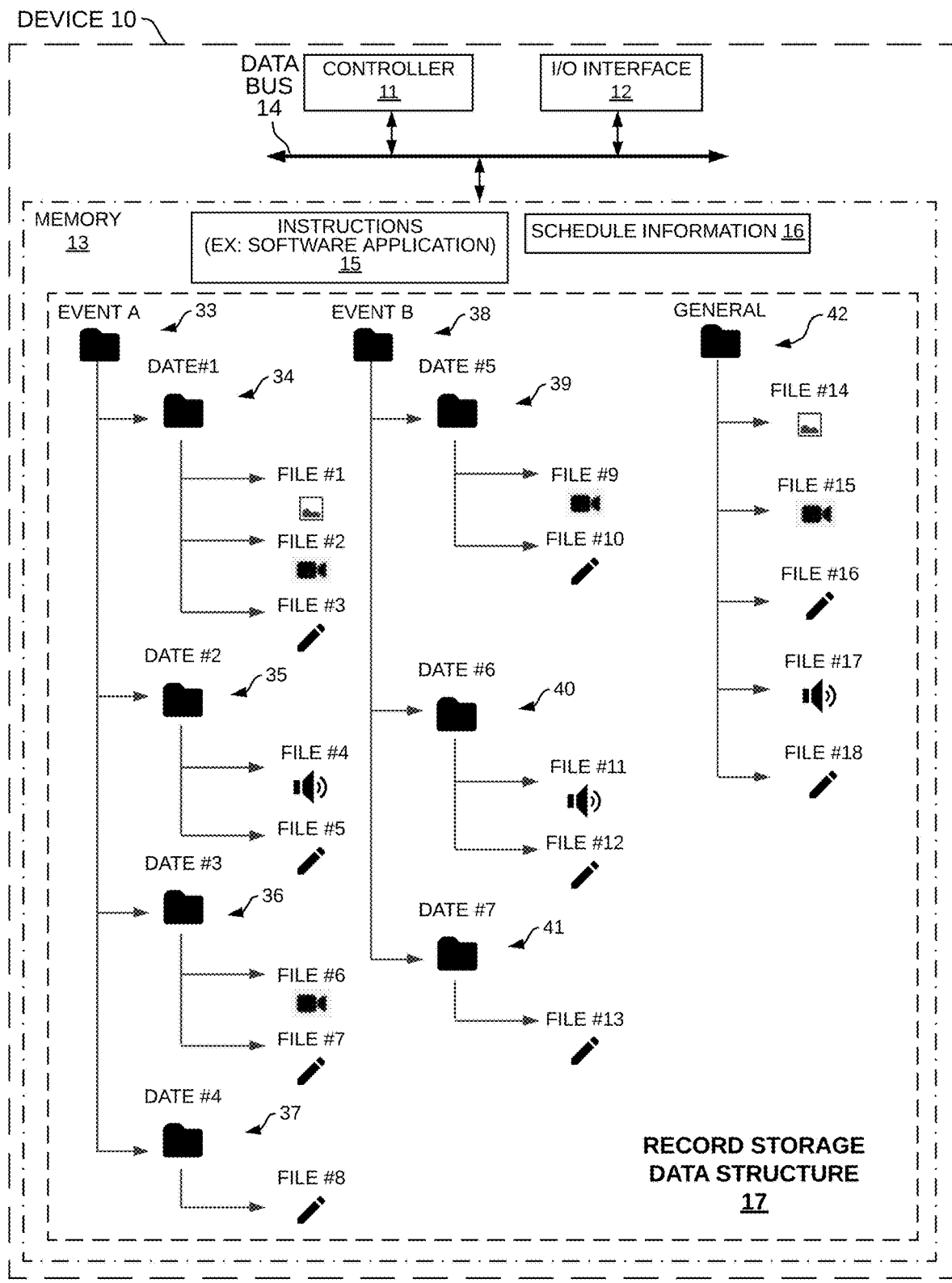
FIG. 3 is a detailed diagram of the record storage data structure 17 after various records have been stored.

FIG. 3 is a detailed diagram of the record storage data structure 17 after various records have been stored. In this example, each record is stored in a subdirectory within a main event directory. In other embodiments, all of the records are stored directly beneath the associated event directory.

The subdirectory 34 (DATE #1) of Event A directory 33 stores an image/photograph record (FILE #1), a video record (FILE #2), and a text record (FILE #3). The subdirectory 35 (DATE #2) of Event A directory 33 stores an audio record (FILE #4) and a text record (FILE #5). The subdirectory 36 (DATE #3) of Event A directory 33 stores a video record (FILE #6) and a text record (FILE #7). The subdirectory 37 (DATE #4) of Event A directory 33 stores a text record (FILE #8).

The subdirectory 39 (DATE #5) of Event B directory 38 stores a video record (FILE #9) and a text record (FILE #10).

The subdirectory 40 (DATE #6) of Event B directory 38 stores an audio record (FILE #11) and a text record (FILE #12). The subdirectory 41 (DATE #7) of Event B directory 38 stores a text record (FILE #13).

General directory 42 stores an image/photograph record (FILE #14), a video record (FILE #15), a text record (FILE #16), an audio record (FILE #17), and a text record (FILE #18).

Figure 4:
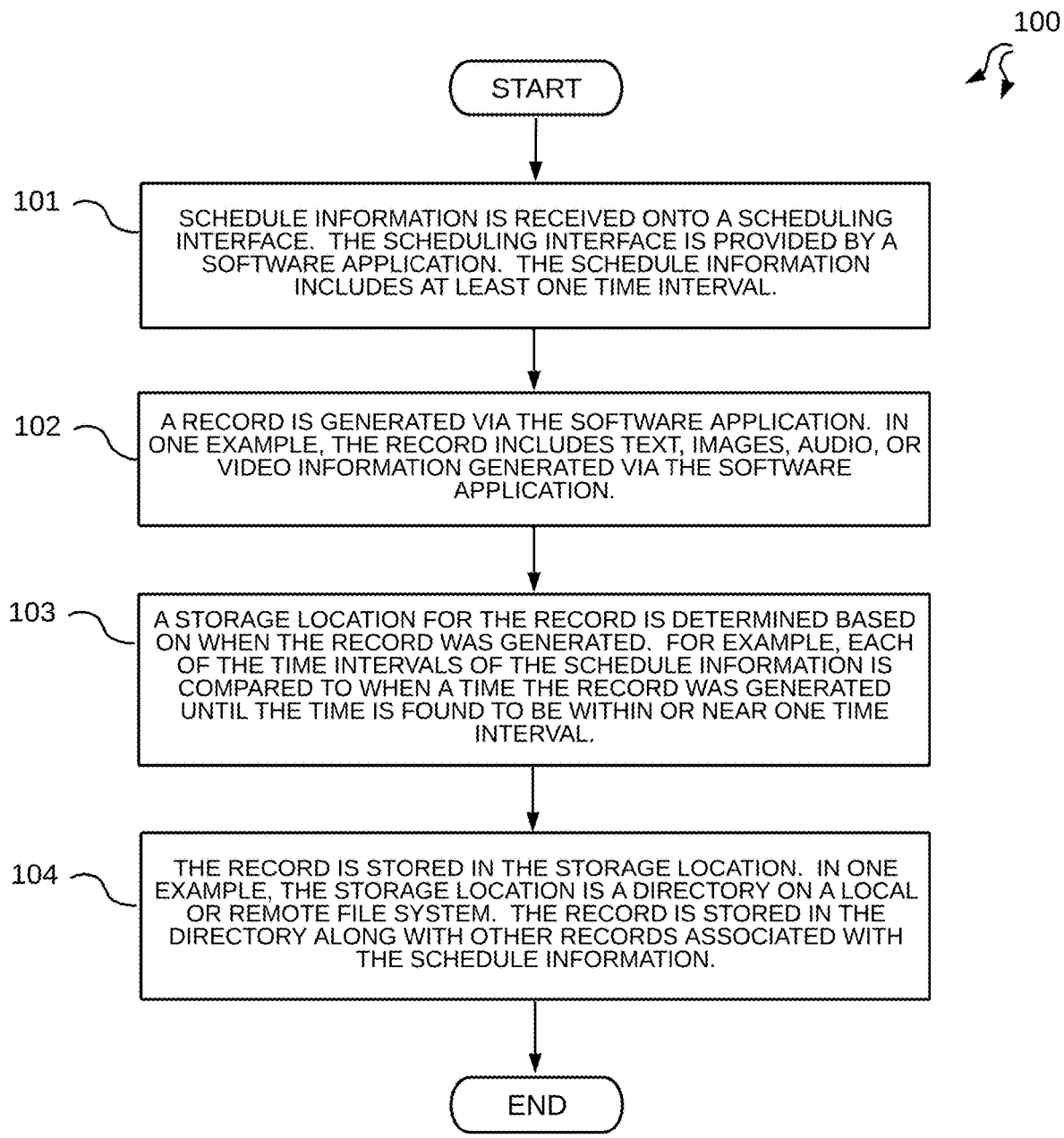
FIG. 4 is a flowchart of a method 100 in accordance with one novel aspect.

FIG. 4 is a flowchart of a method 100 in accordance with one novel aspect. In a first step (step 101), schedule information is received onto a scheduling interface. The scheduling interface is provided by a software application. The schedule information includes at least one time interval. In a second step (step 102), a record is generated via the software application. In one example, the record includes text, images, audio, or video information generated via the software application. In a third step (step 103), a storage location for the record is determined based on when the record was generated. For example, each of the time intervals of the schedule information is compared to when a time the record was generated until the time is found to be within or near one time interval. In a fourth step (step 104), the record is stored in the storage location. In one example, the storage location is a directory on a local or remote file system. The record is stored in the directory along with other records associated with the schedule information.

Figure 5:
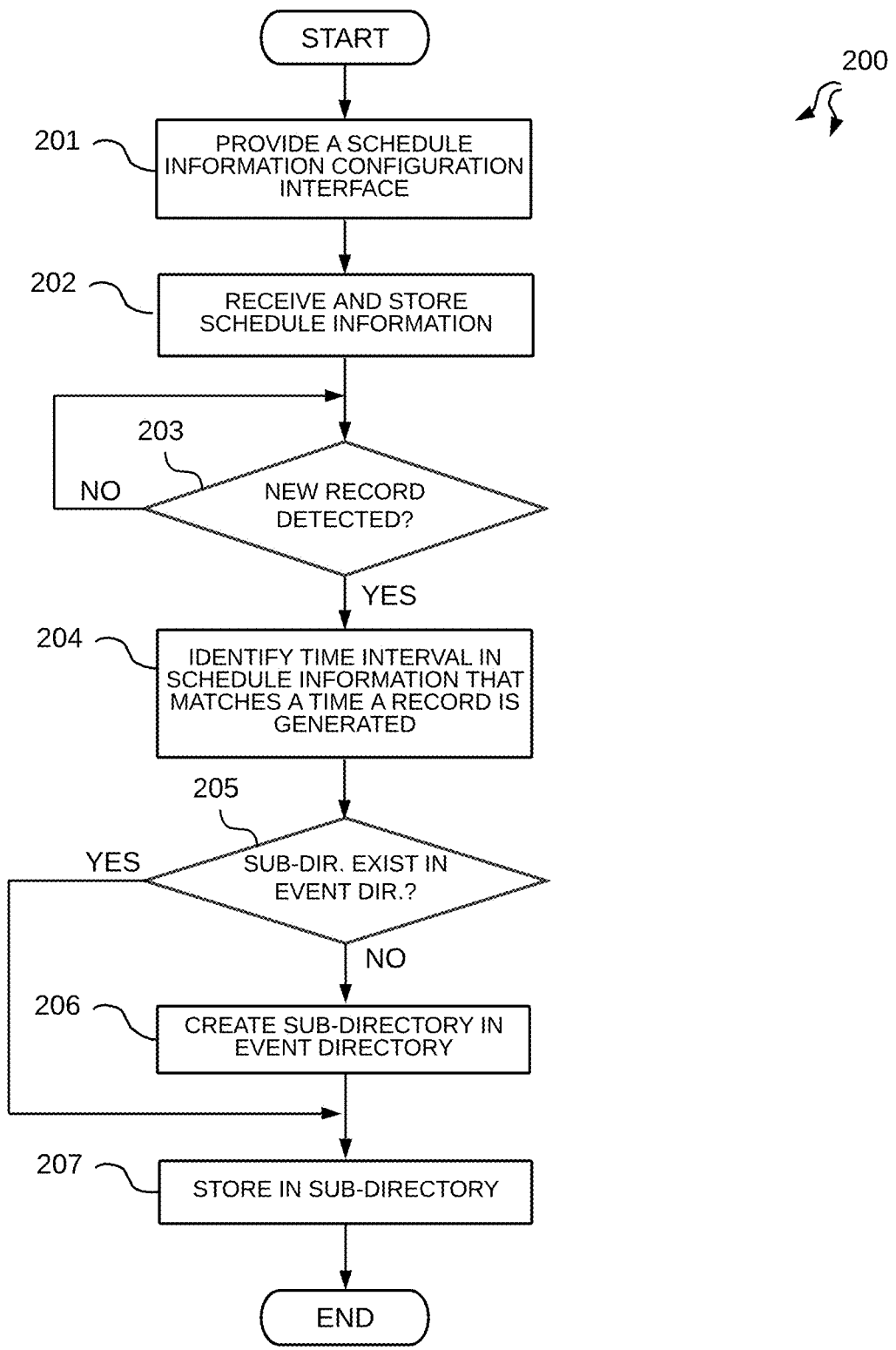
FIG. 5 is a flowchart of a method 200 in accordance with another novel aspect.

FIG. 5 is a flowchart of a method 200 in accordance with another novel aspect. In a first step (step 201), provide a schedule information configuration interface. In a second step (step 202), schedule information is received and stored. In a third step (step 203), a determination is made as to whether a new record has been detected. If a determination is made that no new record has been detected, the method waits at step 203 until a new record is detected. If, on the other hand, a determination is made that a new record has been detected, then the method proceeds to step 204. In a fourth step (step 204), a time interval in the schedule information that matches a time a record is generated is identified. This is also referred to as a matching time interval. In a fifth step (step 205), a determination is made as to whether a new subdirectory exists in an event directory. If a determination is made that a subdirectory does not exist in an event directory, then a subdirectory is created in an event directory in step 206 and the record is stored in the newly created subdirectory in step 207. If, on the other hand, a determination is made at step 205 that a subdirectory already exists in the event directory, then the new record is stored in the subdirectory in step 207.

Figure 6:
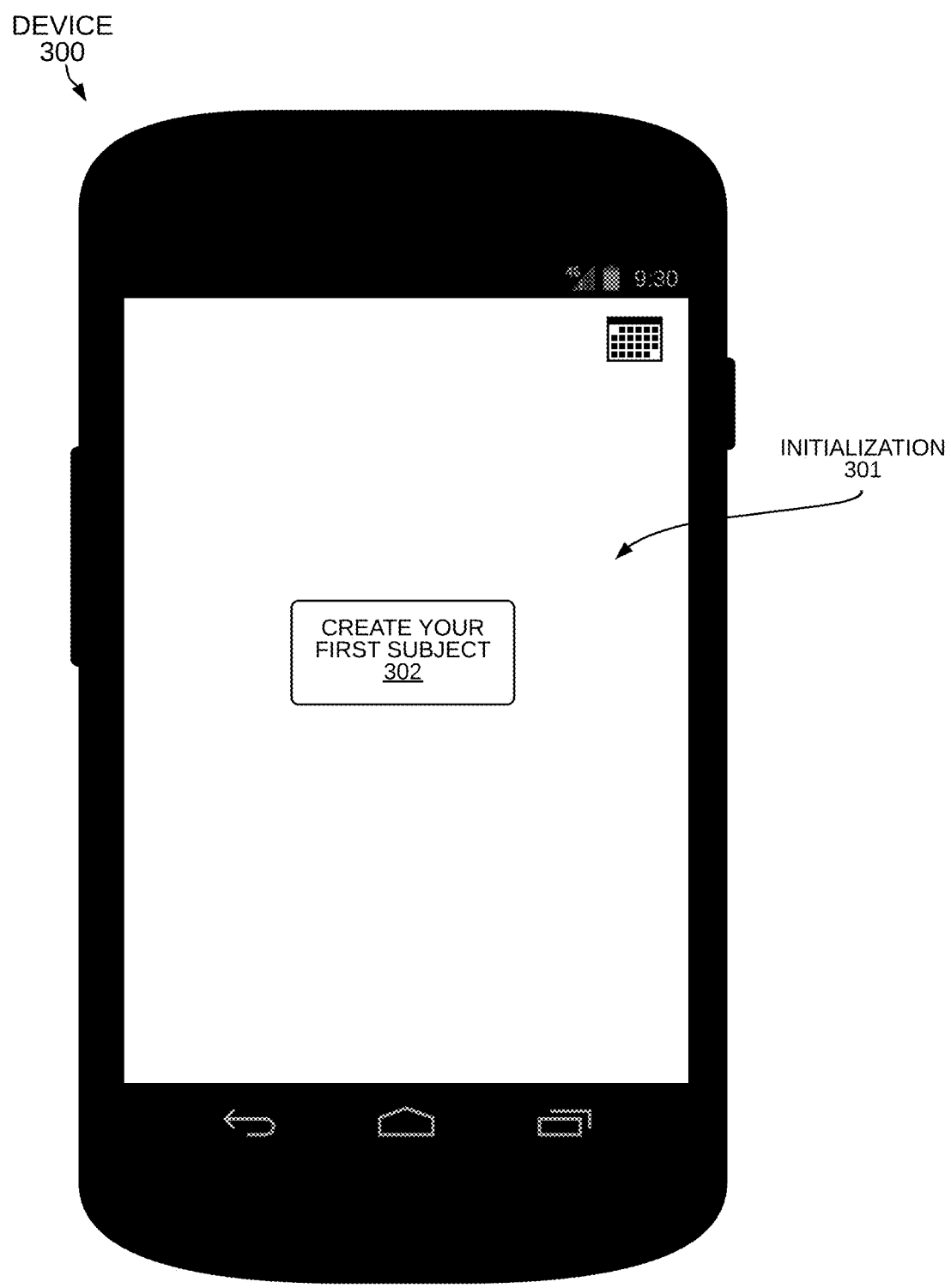
FIG. 6 is a diagram of an initialization interface 301 presented on a device 300.

FIG. 6 is a diagram of an initialization interface 301 presented on a device 300. The device 300 is another embodiment of the device 10 of FIG. 1 and operates a mobile application in accordance with another novel aspect. In this example, the device 300 and the mobile application is employed in the context of an educational environment. Scheduled recurring events are educational classes or subjects. The initialization interface 301 includes a user interface button 302. The user interface button 302 includes "CREATE YOUR FIRST SUBJECT" text.

In the embodiments shown throughout FIGS. 6-23, scheduled recurring events are classes or subjects. In this educational content, time intervals include course start and end dates and class meeting times. This application provides an efficient and convenient note taking tool for students. Students need not be concerned with losing or misplacing notes. All records for a given course will be readily available in a course directory provided through a user interface. Each course directory has a date subdirectory indicating the date the records were generated. Accordingly, all related records taken on a given class meeting date will be available via the date subdirectory. It is appreciated that this mobile application is applicable to other non-educational related contexts and can be applied in any setting where records are generated and stored for different recurring events.

Figure 7:
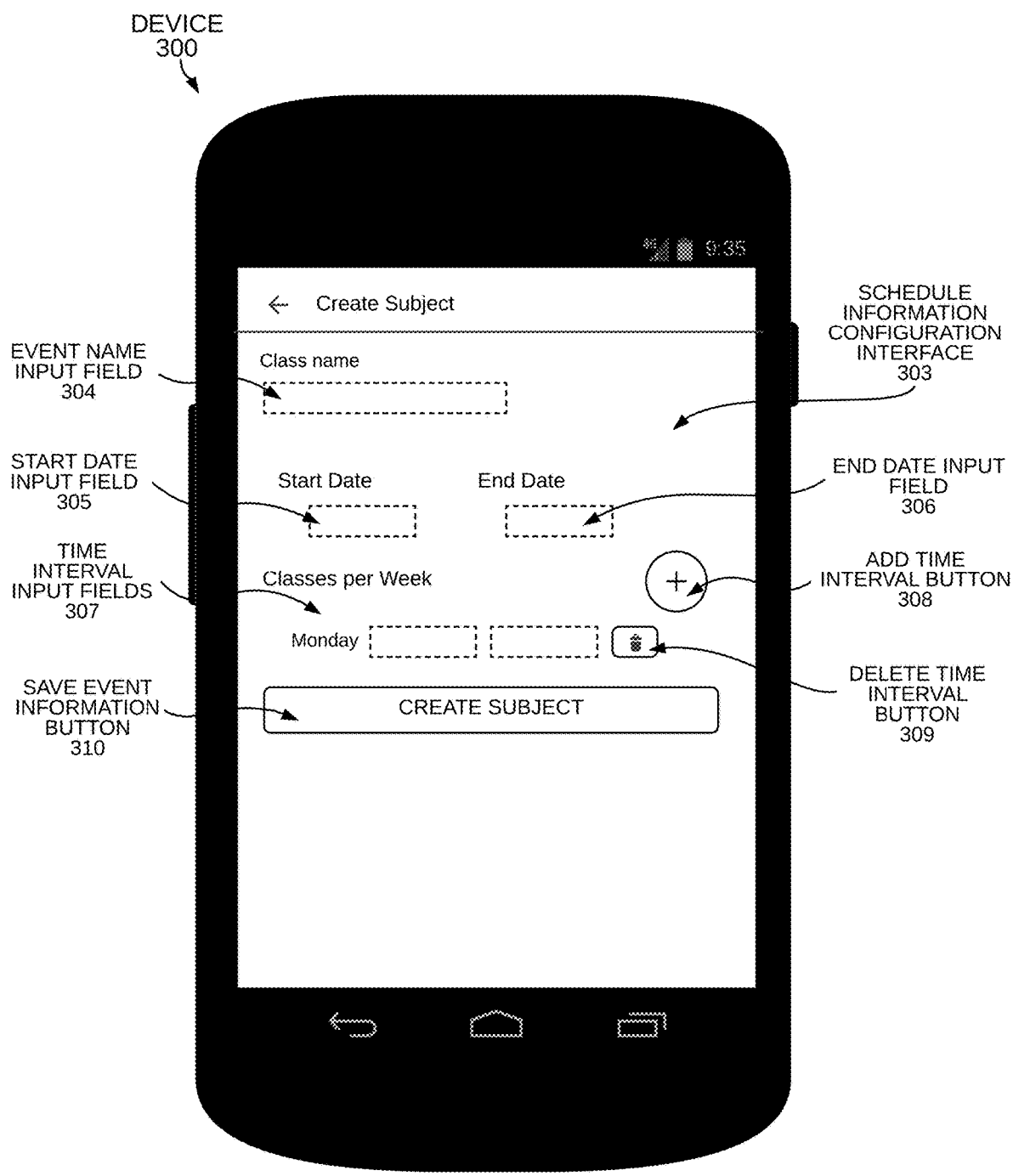
FIG. 7 is a diagram of a schedule information configuration interface 303 presented on device 300.

FIG. 7 is a diagram of a schedule information configuration interface 303 presented on device 300. The schedule information configuration interface 303 includes event name input fields 304, start date input field 305, end date input field 306, time interval input fields 307 and user interface buttons 308, 309, and 310. The user interface button 308 includes "ADD TIME INTERVAL BUTTON" text. The user interface button 309 includes "DELETE TIME INTERVAL BUTTON" text. The user interface button 310 includes "SAVE EVENT INFORMATION BUTTON" text. The schedule information configuration interface 303 is used to configure time intervals for a scheduled recurring event, which in this context is an educational course.

Figure 8:
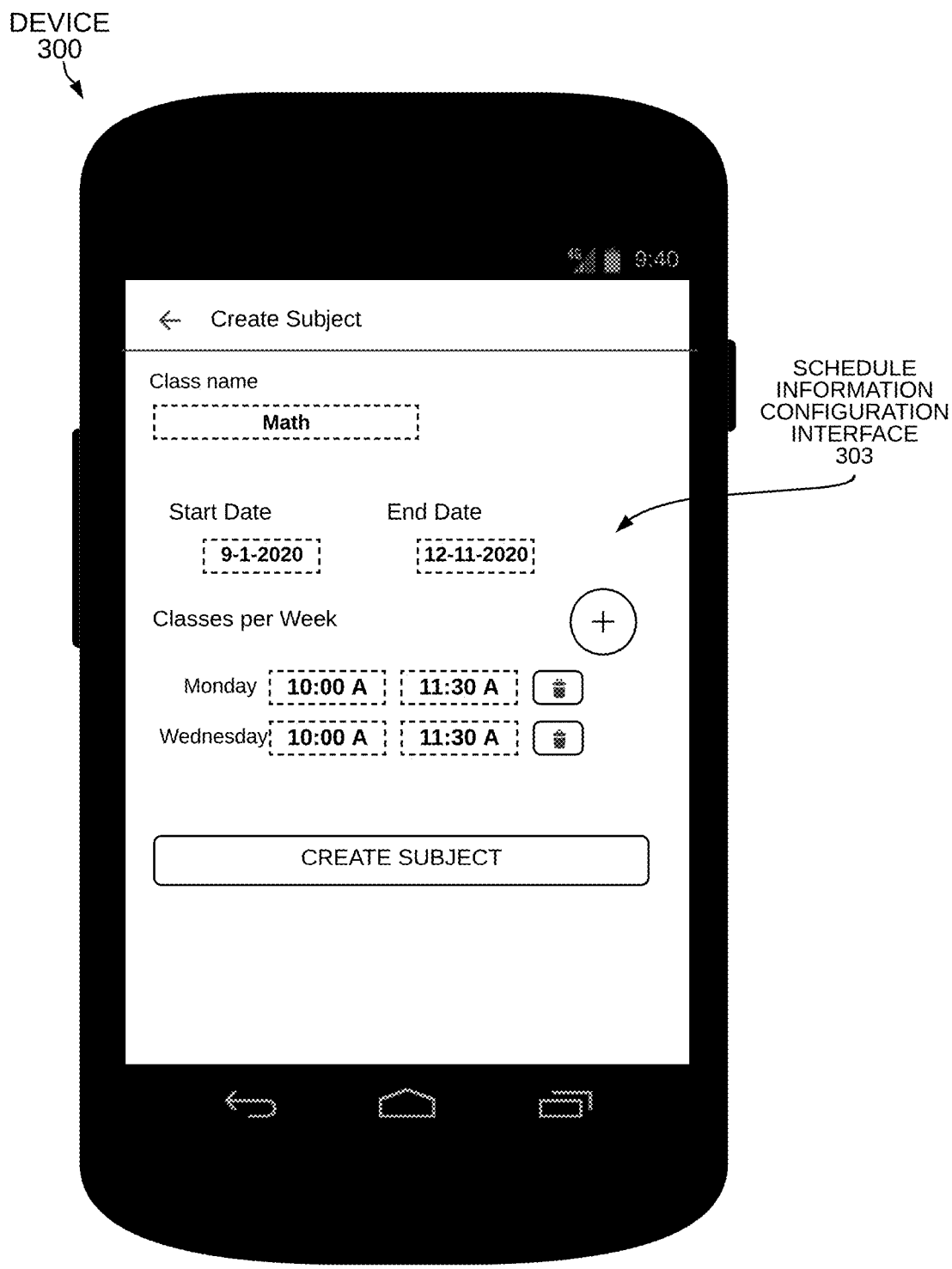
FIG. 8 is a diagram showing how schedule information is configured using the schedule information configuration interface 303.

FIG. 8 is a diagram showing how schedule information is configured using the schedule information configuration interface 303. In this example, the recurring schedule event is configured to be a "Math" course with a start date of "9-1-2020" and an end date of "12-11-2020" and course meeting times of "Monday and Wednesday—10:00 A to 11:30 A".

Figure 9:
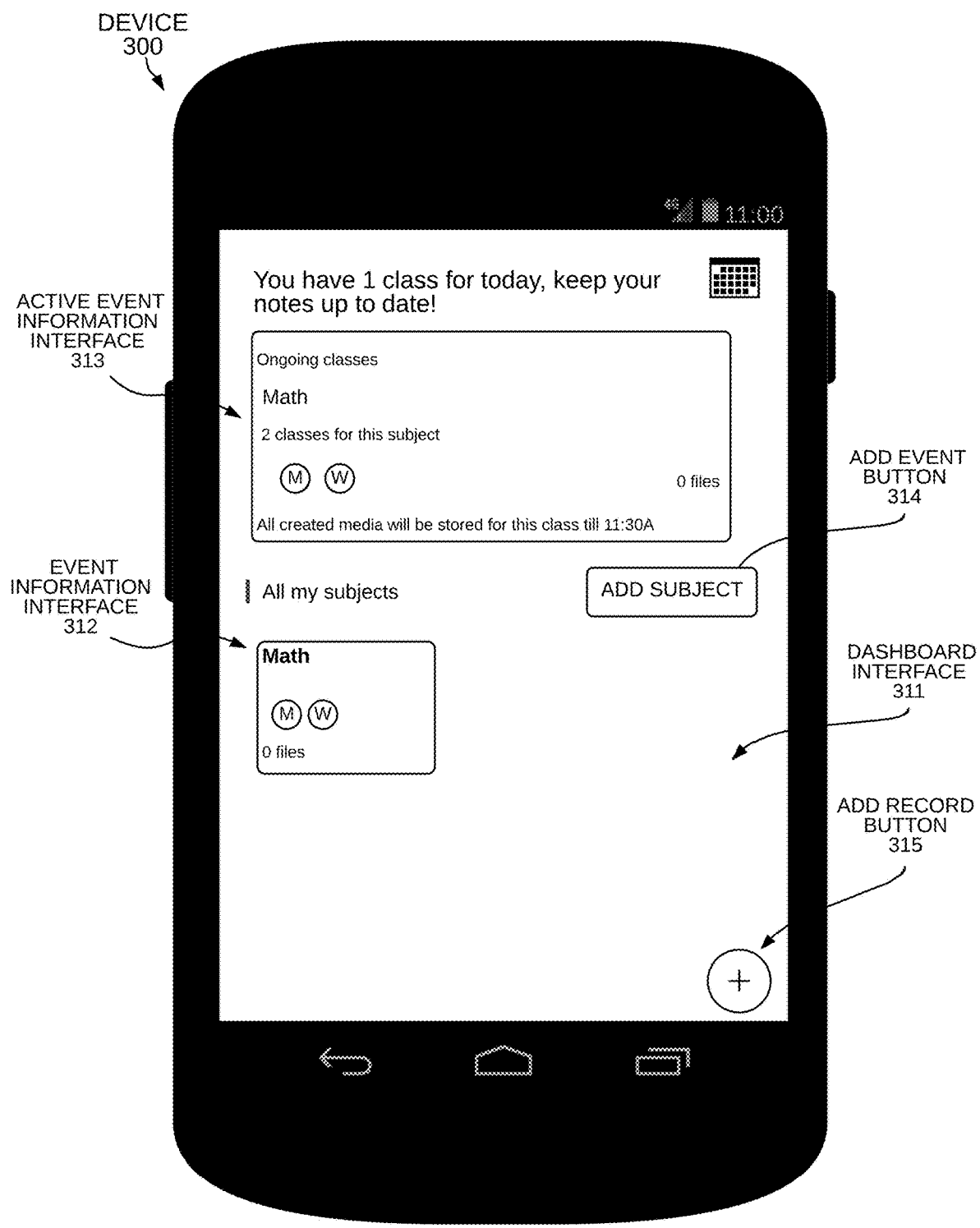
FIG. 9 is a diagram of a dashboard interface 311 presented on device 300.

FIG. 9 is a diagram of a dashboard interface 311 presented on device 300. The dashboard interface 311 includes event information interface 312, active event information interface 313, a user interface button 314, and an add record button 315. The user interface button 314 includes "ADD SUBJECT" text. The event information interface 312 provides information related to schedule information including all courses, meeting days, and number of files stored. The active event information interface 313 indicates when the event is active. Records generated when an event is active are stored in storage locations associated with the event. In this example, records generated before 11:30 A will be stored within the Math directory. The scheduled information is updated by selecting the user interface button 314, which allows a user to add new course subjects and time interval information.

Figure 10:
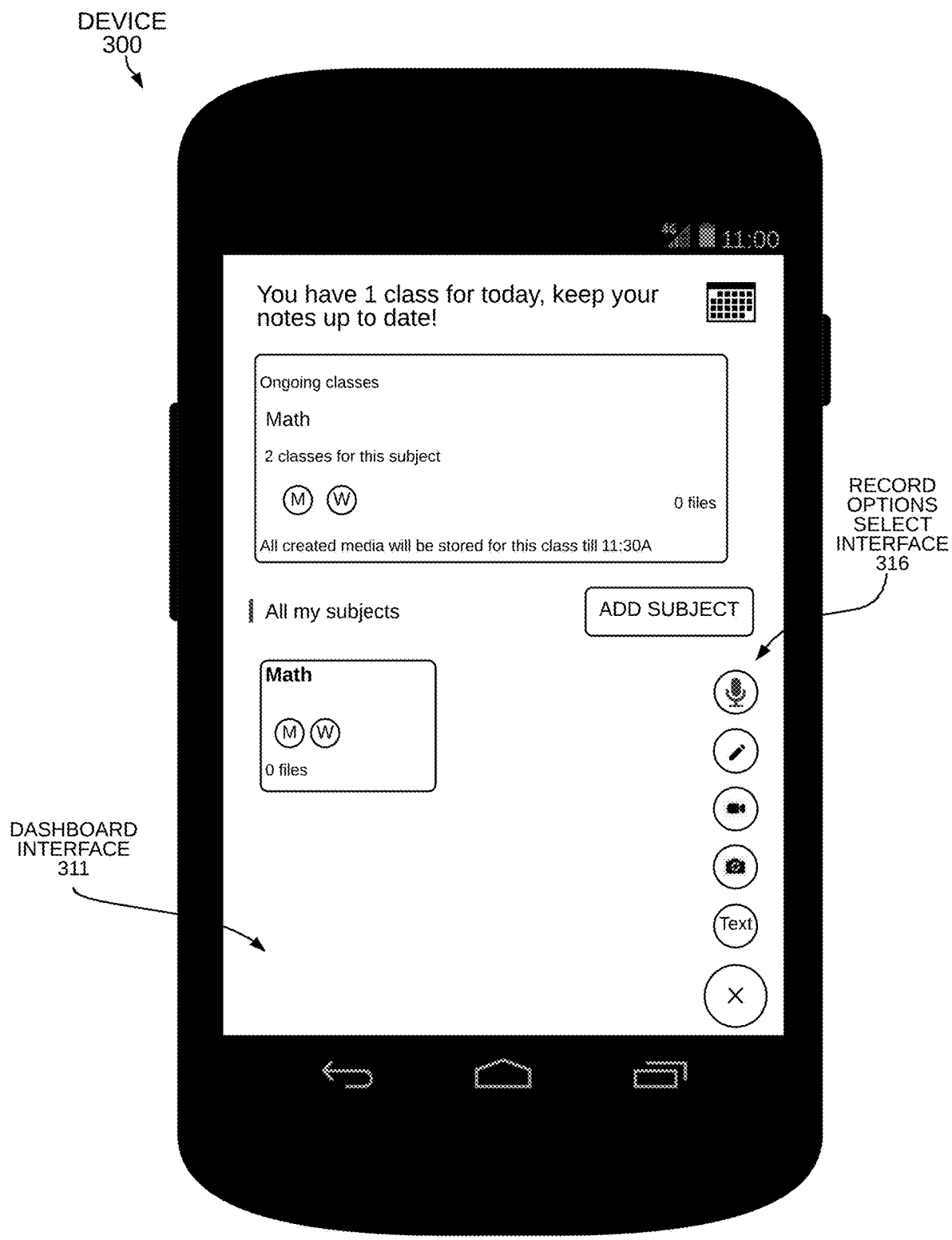
FIG. 10 is a diagram of a dashboard interface 311 presented on device 300.

FIG. 10 is a diagram of a dashboard interface 311 presented on device 300. The dashboard interface 311 includes a record options select interface 316. The record options select interface 316 presents a user with option the type of record to be generated. In response to pressing the add record button 315, the user is presented with options to generate video, audio, image, text, or other digital media records.

Figure 11:
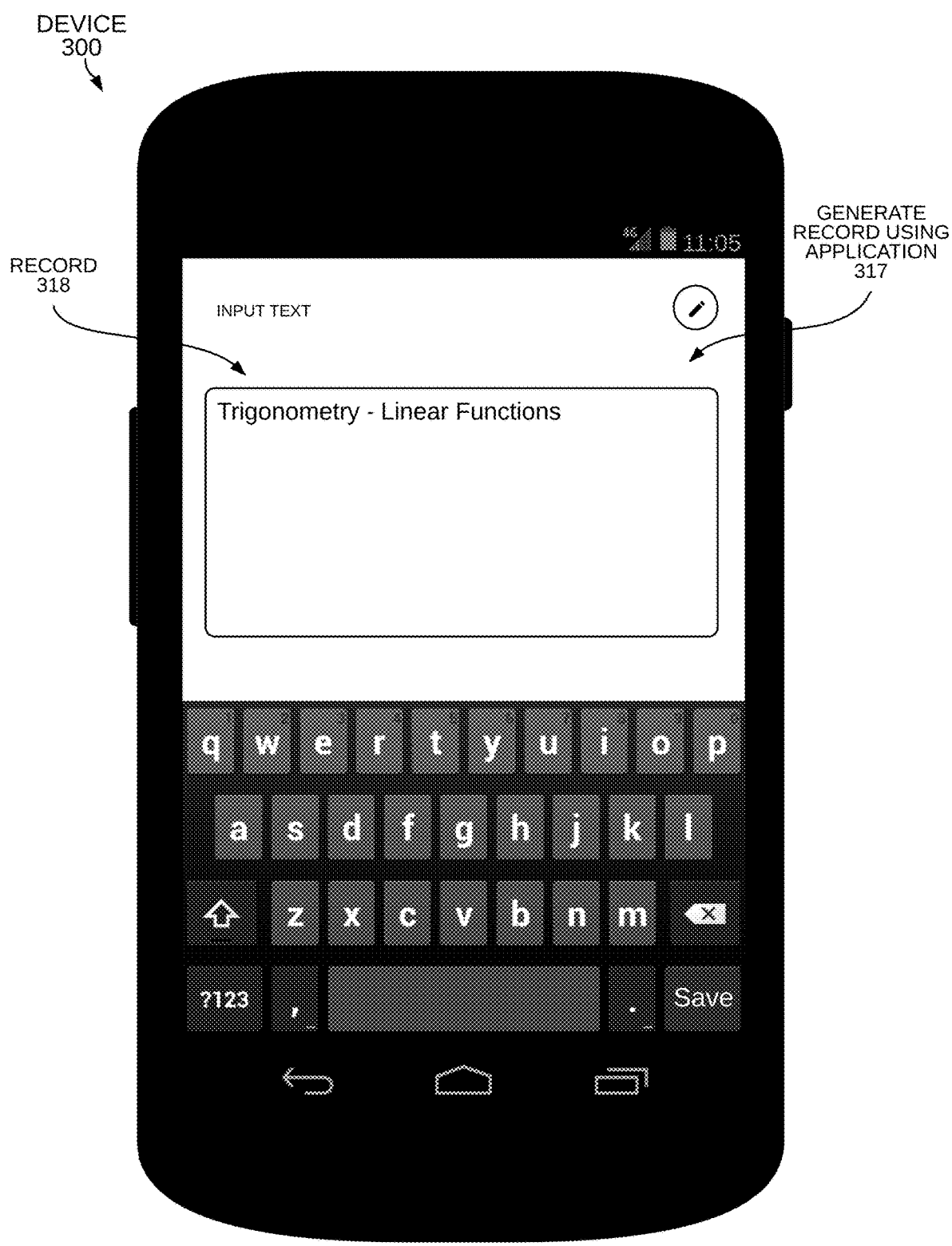
FIG. 11 is a diagram showing how records are generated via the application interface 317 on the device 300.

FIG. 11 is a diagram showing how records are generated via the application interface 317 on the device 300. The record generation interface 317 allows the user to input text using a keyboard of the device 300. Reference numeral 318 identifies the text record that is generated and that will be stored.

Figure 12:
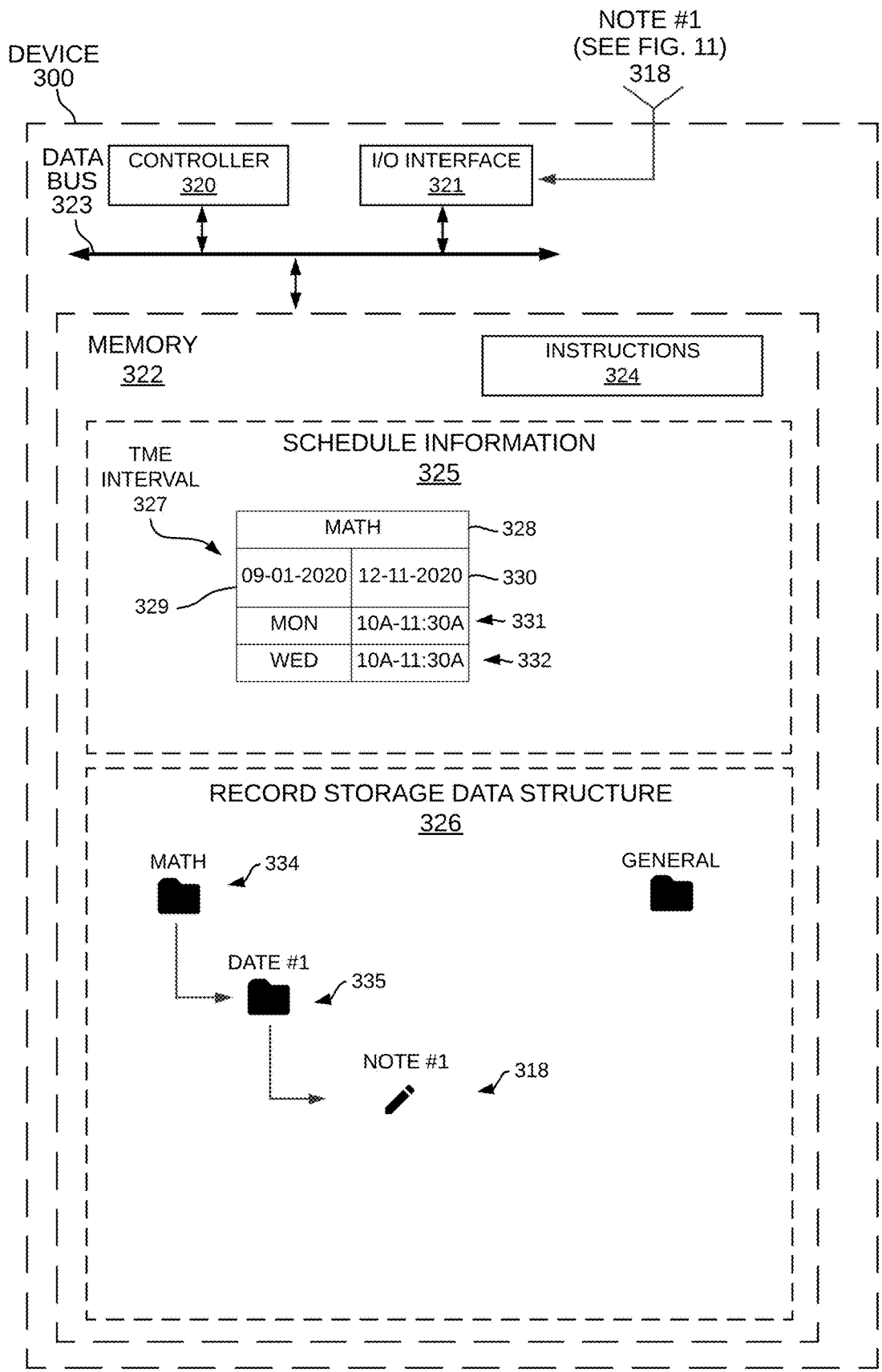
FIG. 12 is a detailed diagram of the device 300.

FIG. 12 is a detailed diagram of the device 300. The device 300 comprises a note 318, a controller 320, an input/output interface 321, a memory 322, and a data bus 323. The memory 322 comprises instructions 324, a schedule information 325, and a record storage data structure 326. The schedule information 325 comprises a time interval 327, an event 328, a start date 329, an end date 330, a time interval 331, and a time interval 332. The event 328 includes "MATH" text. The start date 329 includes "09-01-2020" text. The end date 330 includes "12-11-2020" text. The time interval 331 includes "Monday 10 A-11:30 A" text. The time interval 332 includes "Wednesday 10 A-11:30 A" text. The time interval 327 is configured by the user as shown in FIG. 8. The record data structure 326 comprises the subdirectory 335 (DATE #1) of Math directory 334 which stores a text record (NOTE #1). Note #1 is record 318 generated as shown in FIG. 11 and is stored within the Math directory 334 within subdirectory 335.

Figure 13:
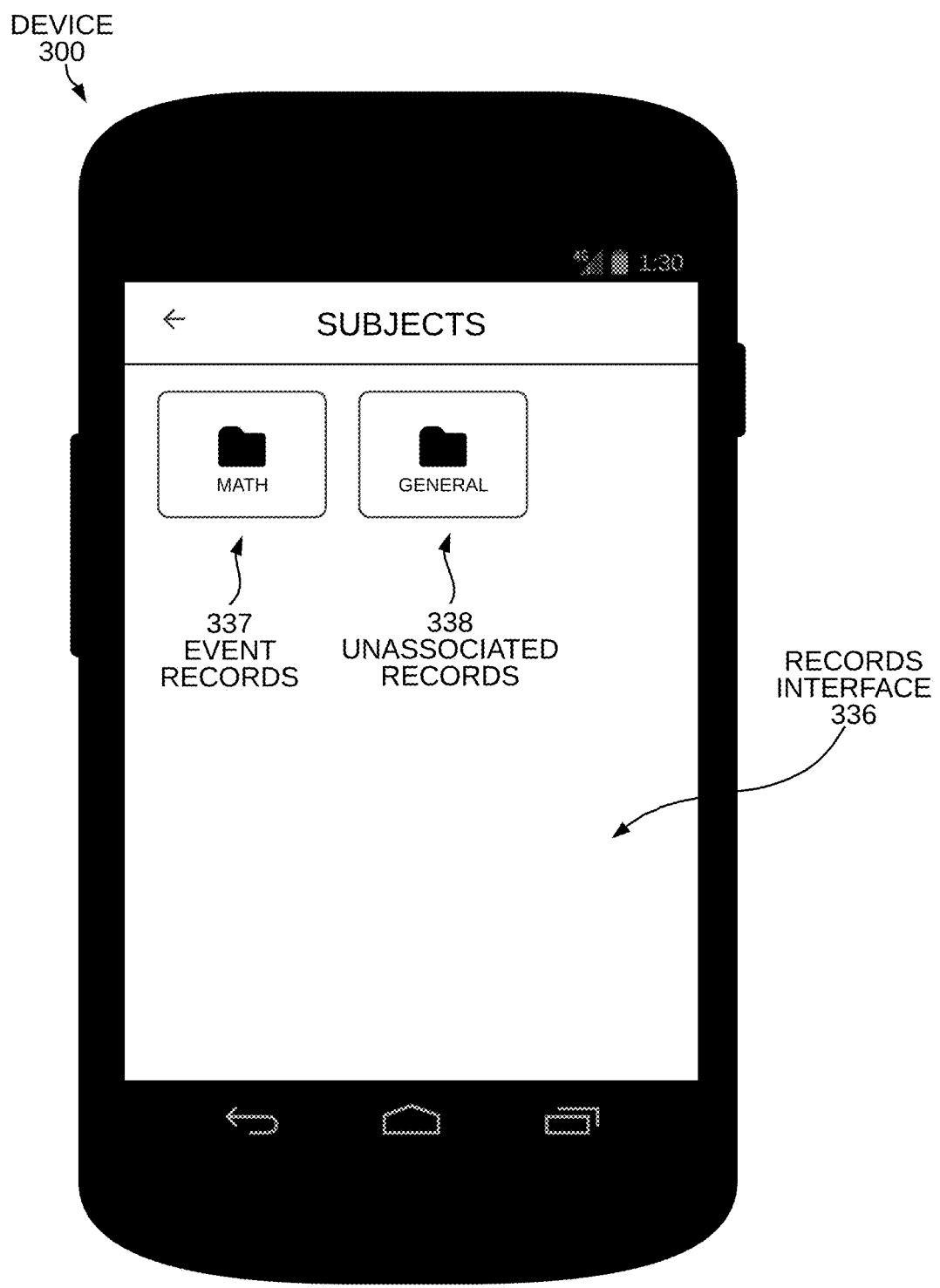
FIG. 13 is a diagram of a records interface 336 presented on device 300.

FIG. 13 is a diagram of a records interface 336 presented on device 300. The records interface 336 includes event records 337 and unassociated records 338. This interface provides significant improvements in retrieval speed as compared to prior record storing and retrieving techniques. All records for a given course are readily available to the user. As the student records notes for each course, the application automatically sorts and stores records depending on when the records were generated. The software application performs sorting and storing of records based on schedule information without any user input or human intervention.

Figure 14:
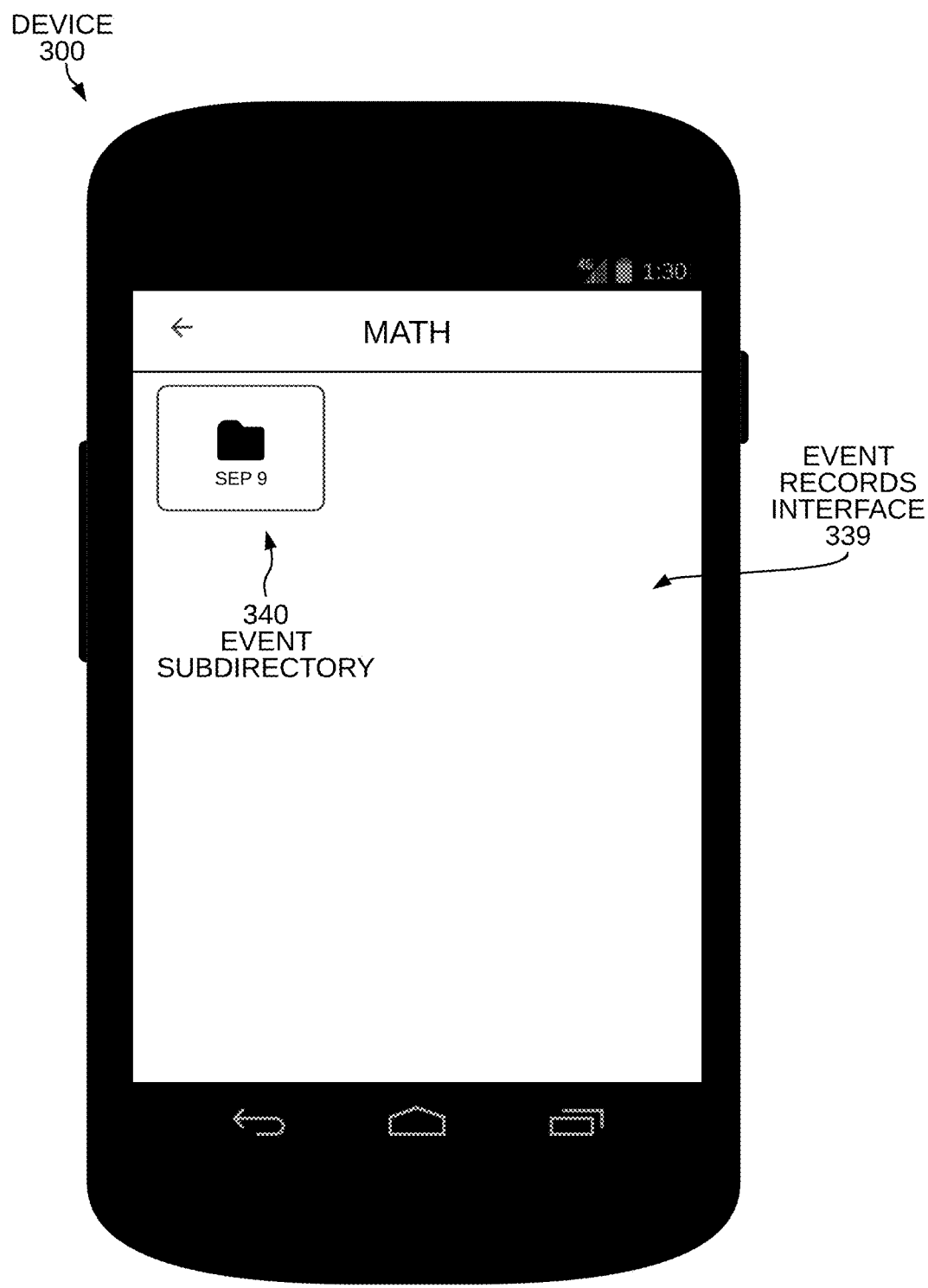
FIG. 14 is a diagram of an event records interface 339 presented on device 300.

FIG. 14 is a diagram of an event records interface 339 presented on device 300. The event records interface 339 includes an event subdirectory 340. This directory presents all records for "Math" course on "Sept 9".

Figure 15:
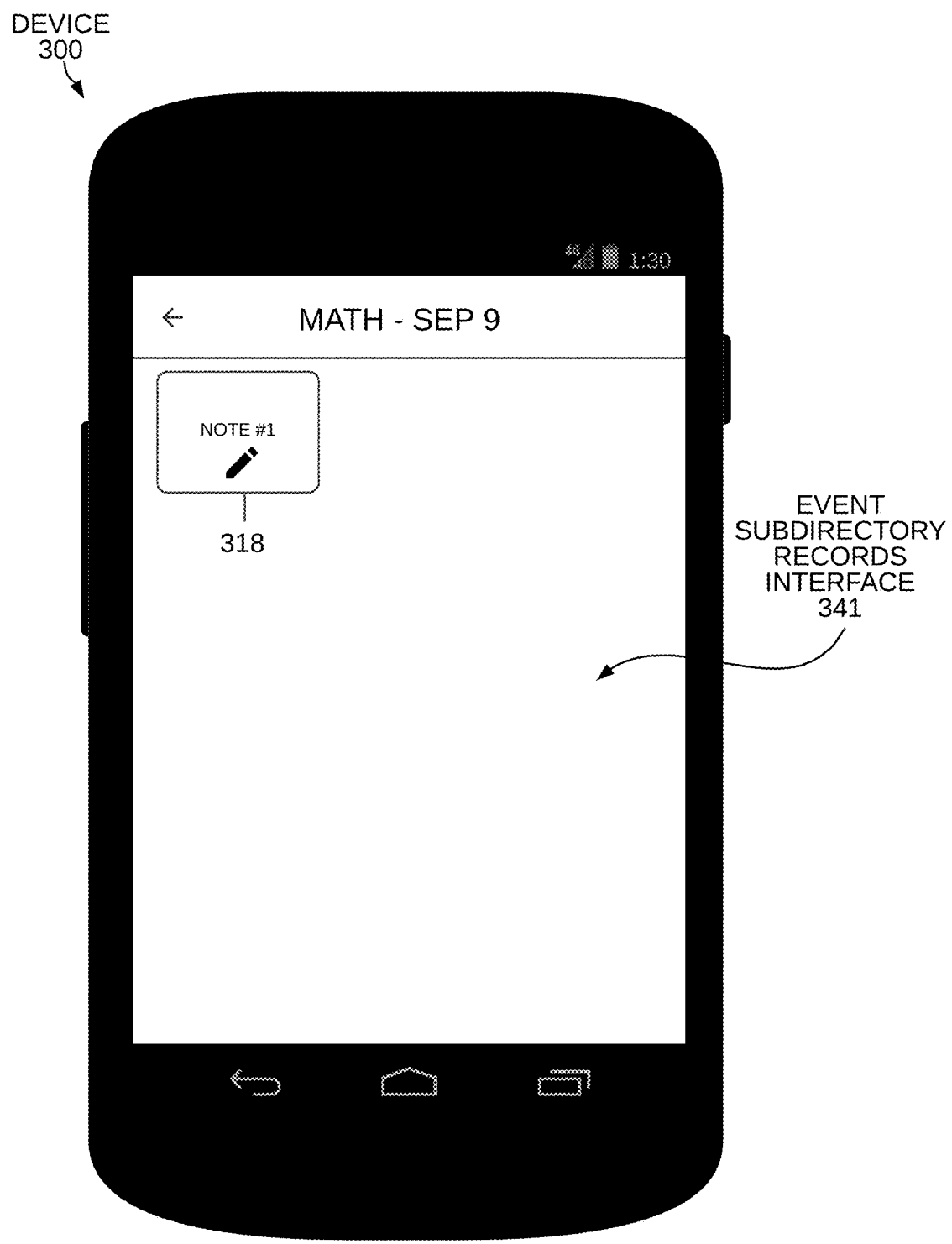
FIG. 15 is a diagram of an event subdirectory records interface 341 presented on device 300.

FIG. 15 is a diagram of an event subdirectory records interface 341 presented on device 300. The event subdirectory records interface 341 includes text record 318.

Figure 16:
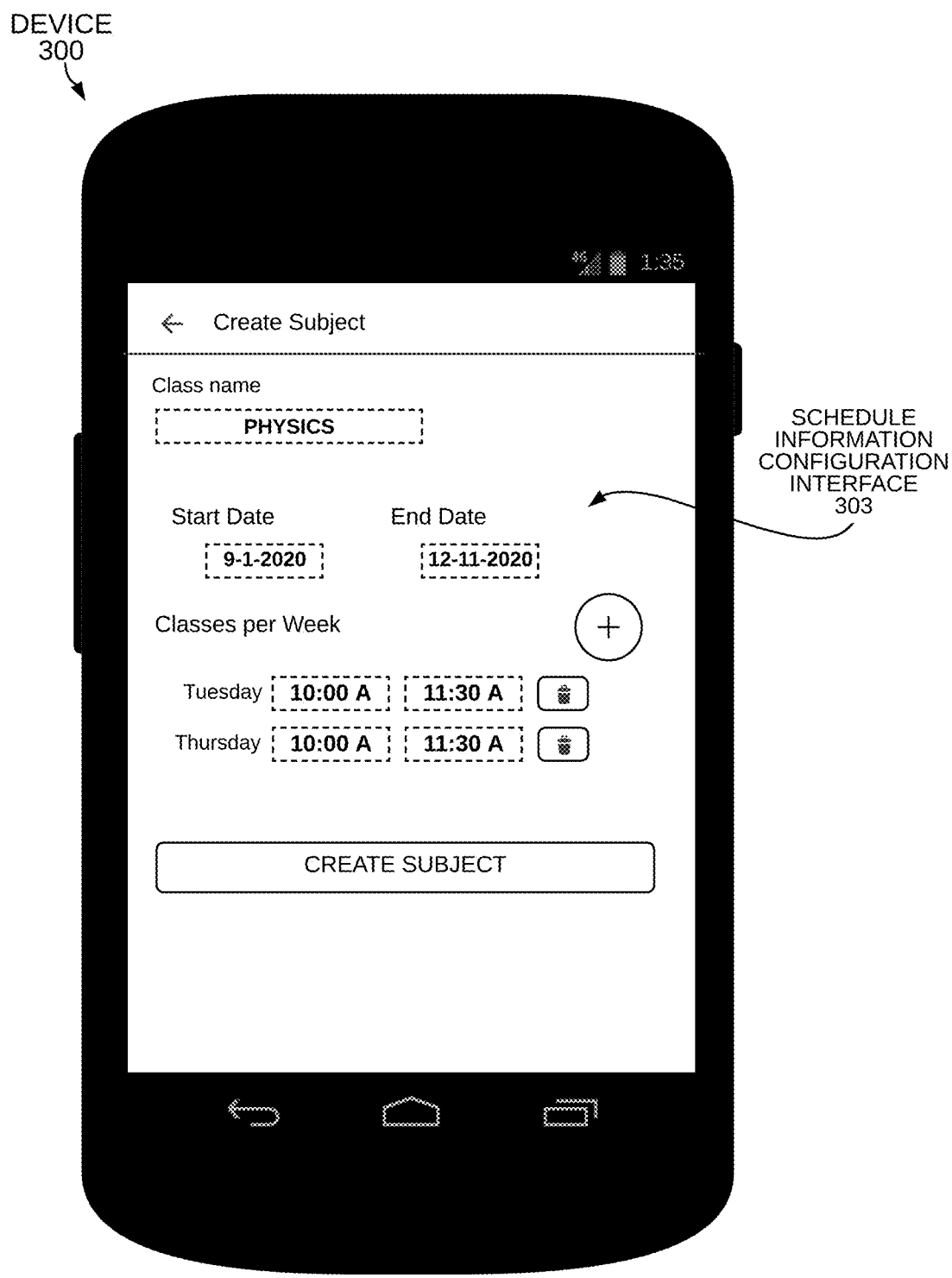
FIG. 16 is a diagram showing how schedule information is configured using the schedule information configuration interface 303.

FIG. 16 is a diagram showing how schedule information is configured using the schedule information configuration interface 303. In this example, the recurring schedule event is configured to be a "Physics" course with a start date of "9-1-2020" and an end date of "12-11-2020" and course meeting times of "Tuesday and Thursday—10:00 A to 11:30 A".

Figure 17:
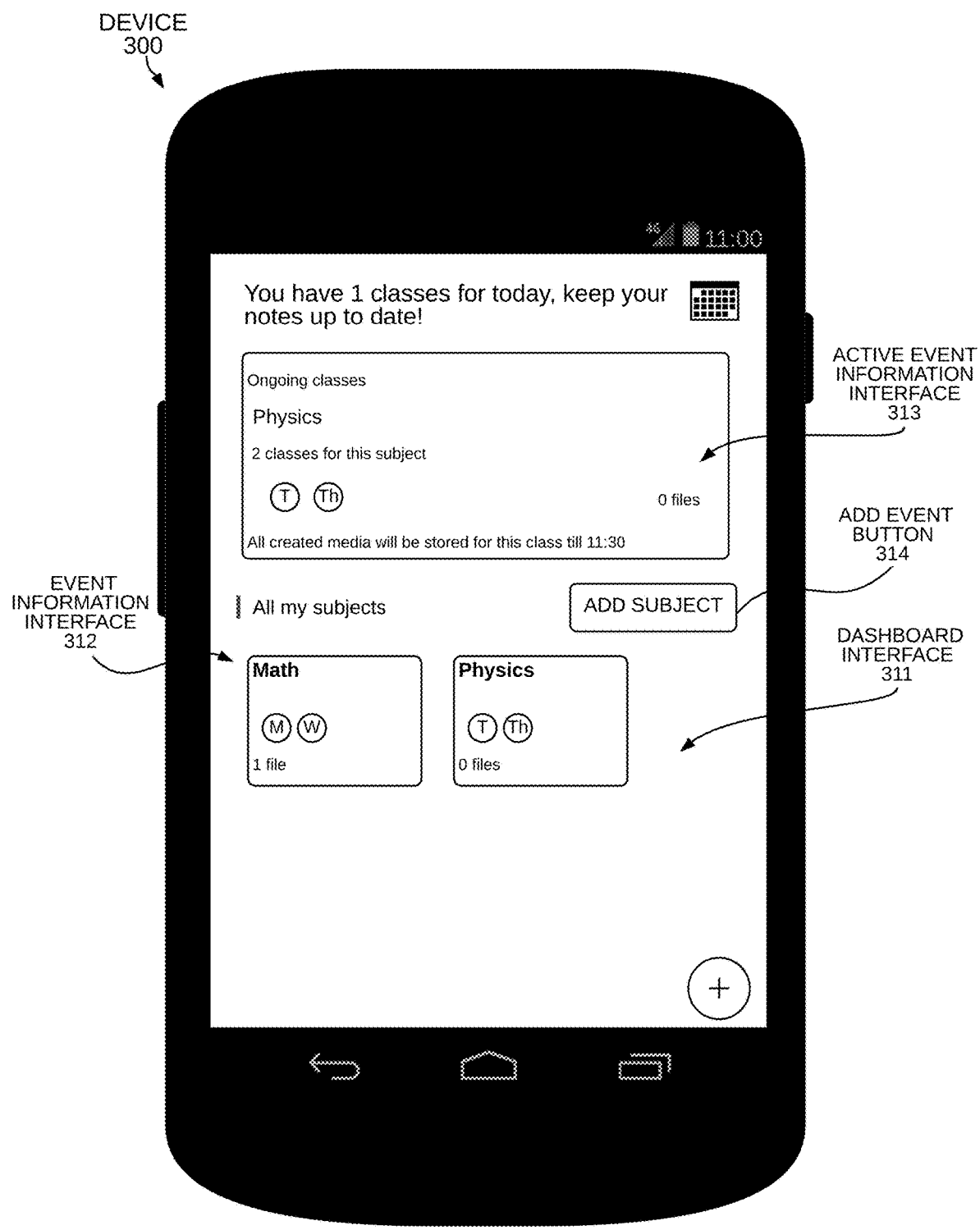
FIG. 17 is a diagram of a dashboard interface 311 presented on the device 300.

FIG. 17 is a diagram of a dashboard interface 311 presented on the device 300. The dashboard interface 311 includes event information interface 312, active event information interface 313, and a user interface button 314.

Figure 18:
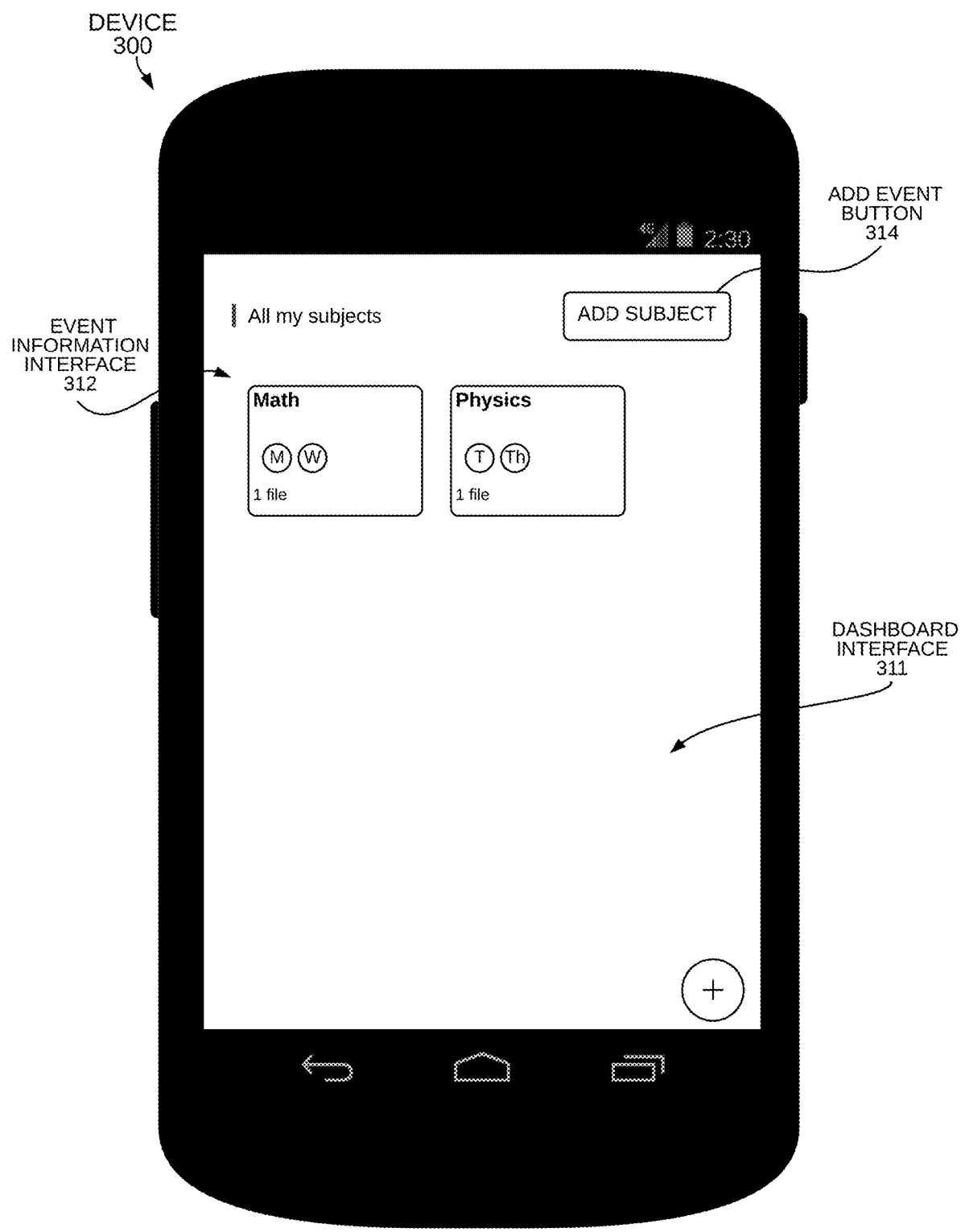
FIG. 18 is a diagram of a dashboard interface 311 presented on the device 300 when outside of any time interval within the schedule information 325.

FIG. 18 is a diagram of a dashboard interface 311 presented on the device 300 when outside of any time interval within the schedule information 325. The dashboard interface 311 includes event information interface 312, and a user interface button 314. In this example, there is no active event because the instant time is outside of any time interval within the schedule information.

Figure 19:
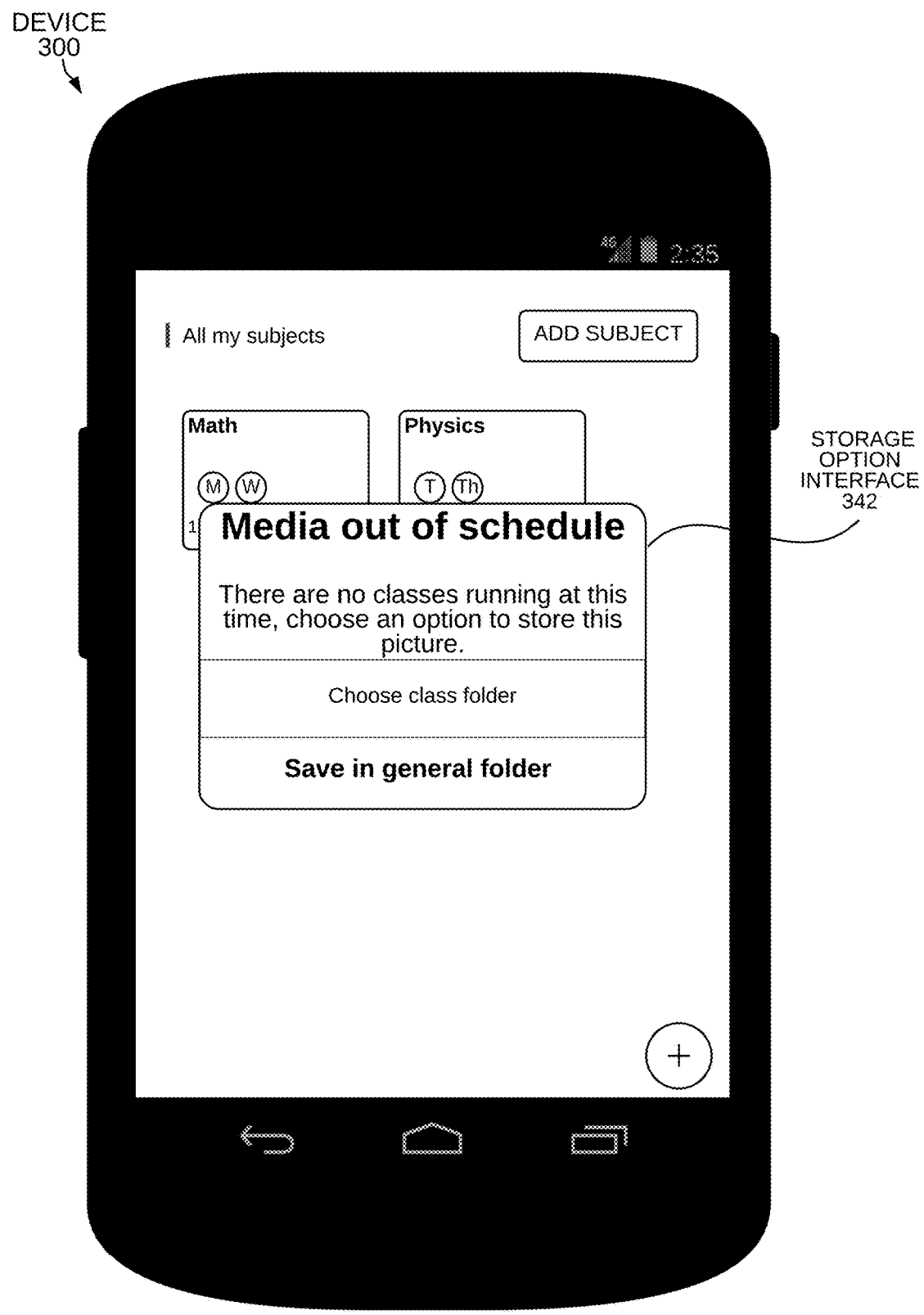
FIG. 19 is a diagram of a storage option interface 342 presented on the device 300.

FIG. 19 is a diagram of a storage option interface 342 presented on device 300. In this embodiment, when a record is generated outside of any time interval within the schedule information, the user is presented with a storage option interface 342. The storage option interface 342 permits the user to select where the record is to be stored. Alternatively, the record is stored in the General directory.

Figure 20:
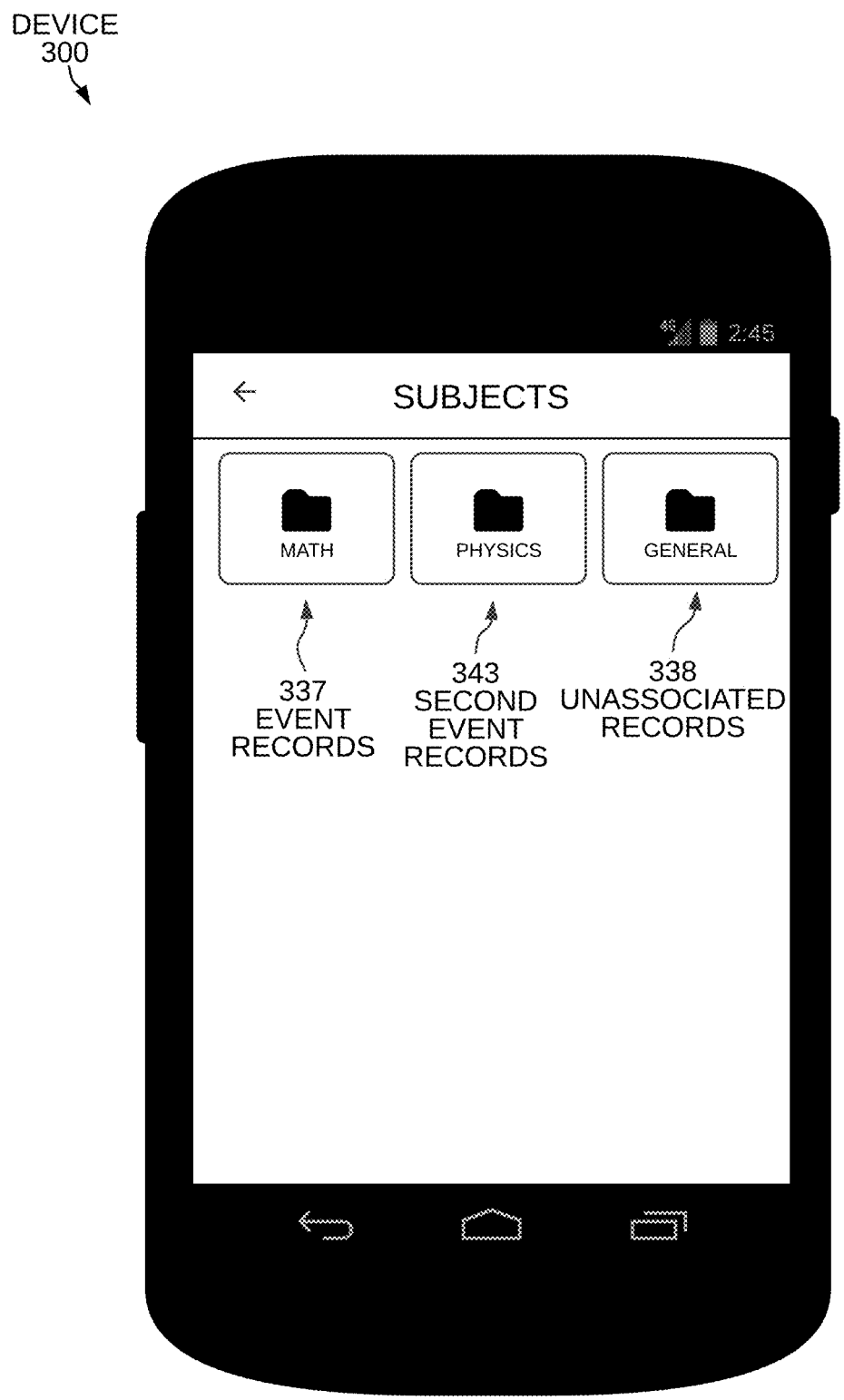
FIG. 20 is a diagram of the device 300 comprising event records 337, second event records 343, and unassociated records 338.

FIG. 20 is a diagram of the device 300 comprising event records 337, second event records 343, and unassociated records 338.

Figure 21:
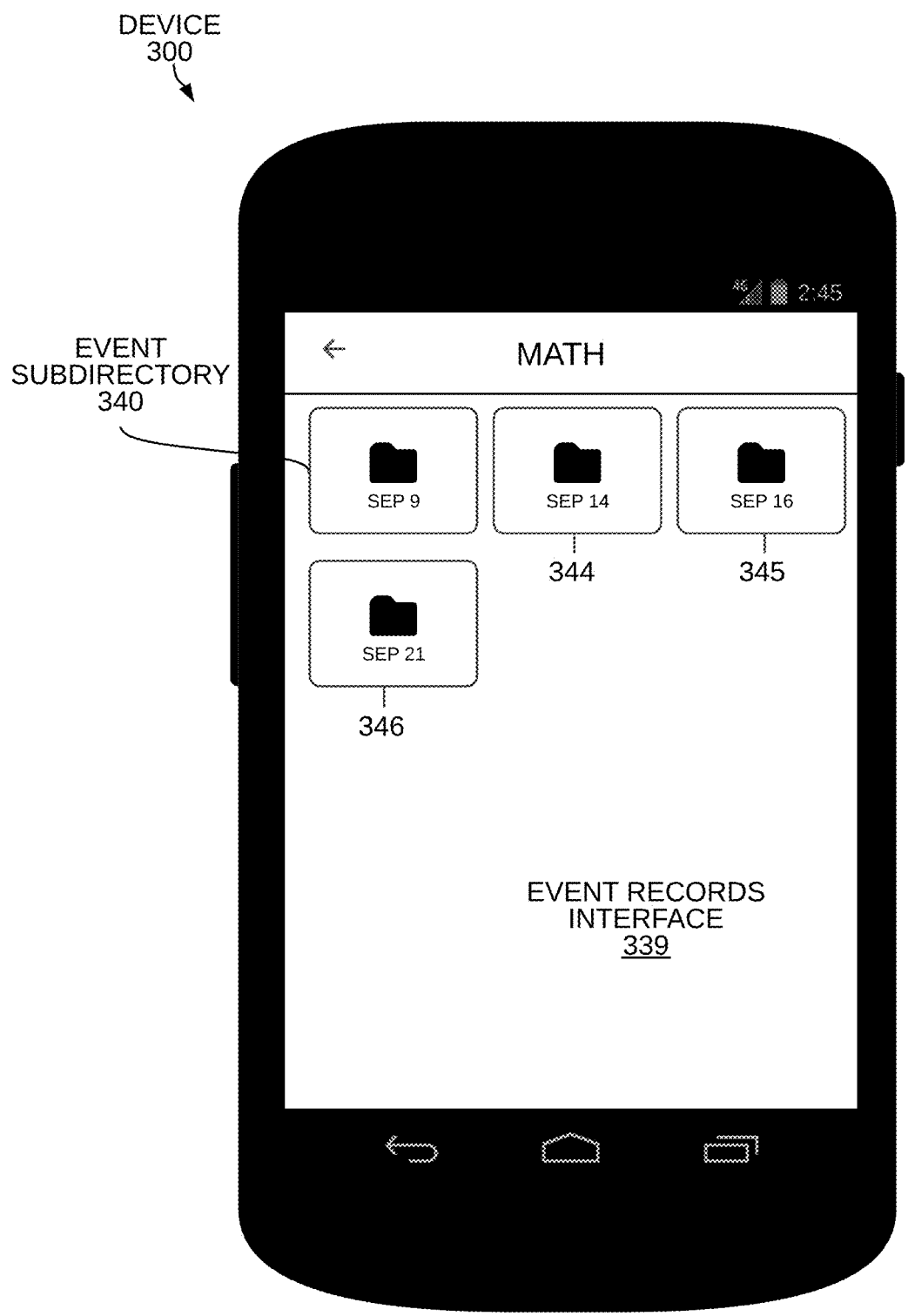
FIG. 21 is a diagram of an event records interface 339 presented on the device 300.

FIG. 21 is a diagram of an event records interface 339 presented on the device 300. The event records interface 339 includes an event subdirectory 340, 344, 345, and 346.

Figure 22:
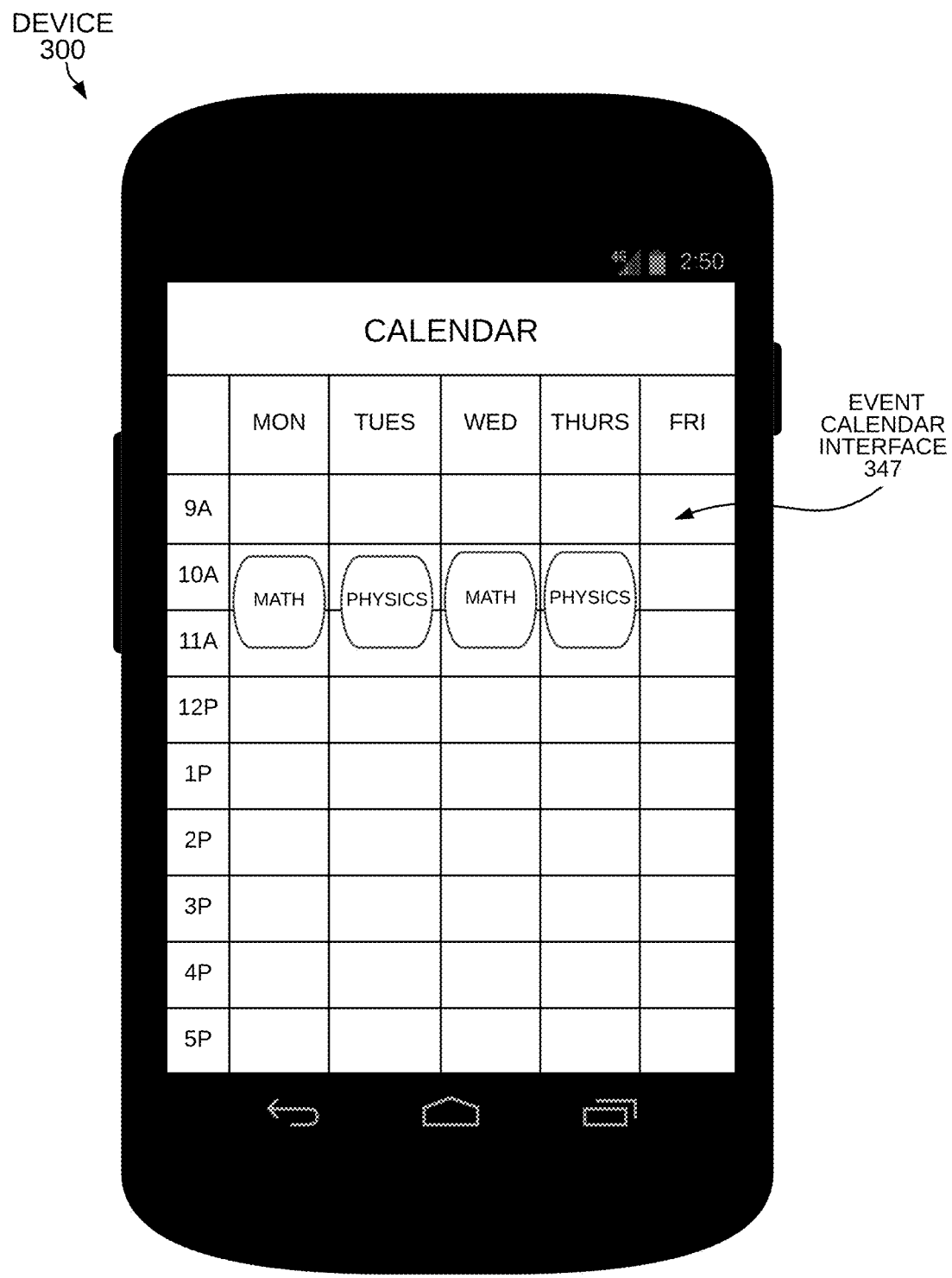
FIG. 22 is a diagram of an event calendar interface 347 presented on the device 300.

FIG. 22 is a diagram of an event calendar interface 347 presented on the device 300.

Figure 23:
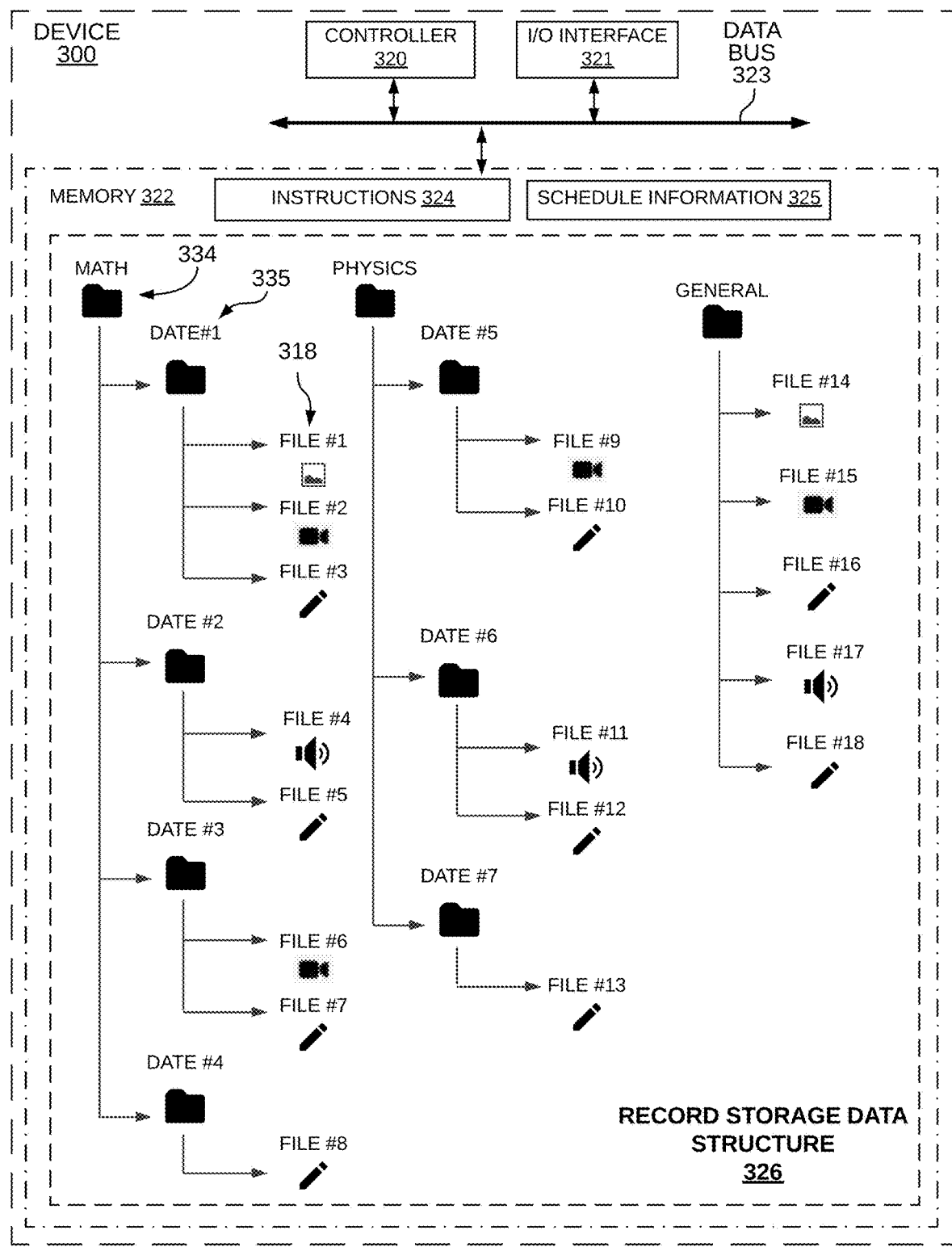
FIG. 23 is a detailed diagram of the record storage data structure 326 stored in the memory 322 of the device 300.

FIG. 23 is a detailed diagram of the record storage data structure 326 stored in the memory 322 of the device 300. The device 300 comprises a controller 320, an input/output interface 321, a memory 322, a data bus 323, and a record storage data structure 326. The memory 322 comprises instructions 324 and schedule information 325. The record storage data structure 326 comprises Math, Physics, and General directories.

The Math directory 334 includes subdirectories DATE #1 335, DATE #2, DATE #3, and DATE #4. Subdirectory DATE #1 335 stores an image/photograph record (FILE #1) 318, a video record (FILE #2), and a text record (FILE #3). Subdirectory DATE #2 stores an audio record (FILE #4), and a text record (FILE #5). Subdirectory DATE #3 stores a video record (FILE #6), and a text record (FILE #7). Subdirectory DATE #4 stores a text record (FILE #8).

The Physics directory includes subdirectories DATE #5, DATE #6, and DATE #7. Subdirectory DATE #5 stores a video record (FILE #9), and a text record (FILE #10). Subdirectory DATE #6 stores an audio record (FILE #11), and a text record (FILE #12). Subdirectory DATE #7 stores a text record (FILE #13).

The General directory stores an image/photograph record (FILE #14), a video record (FILE #15), a text record (FILE #16), an audio record (FILE #17), and a text record (FILE #18).

Figure 24:
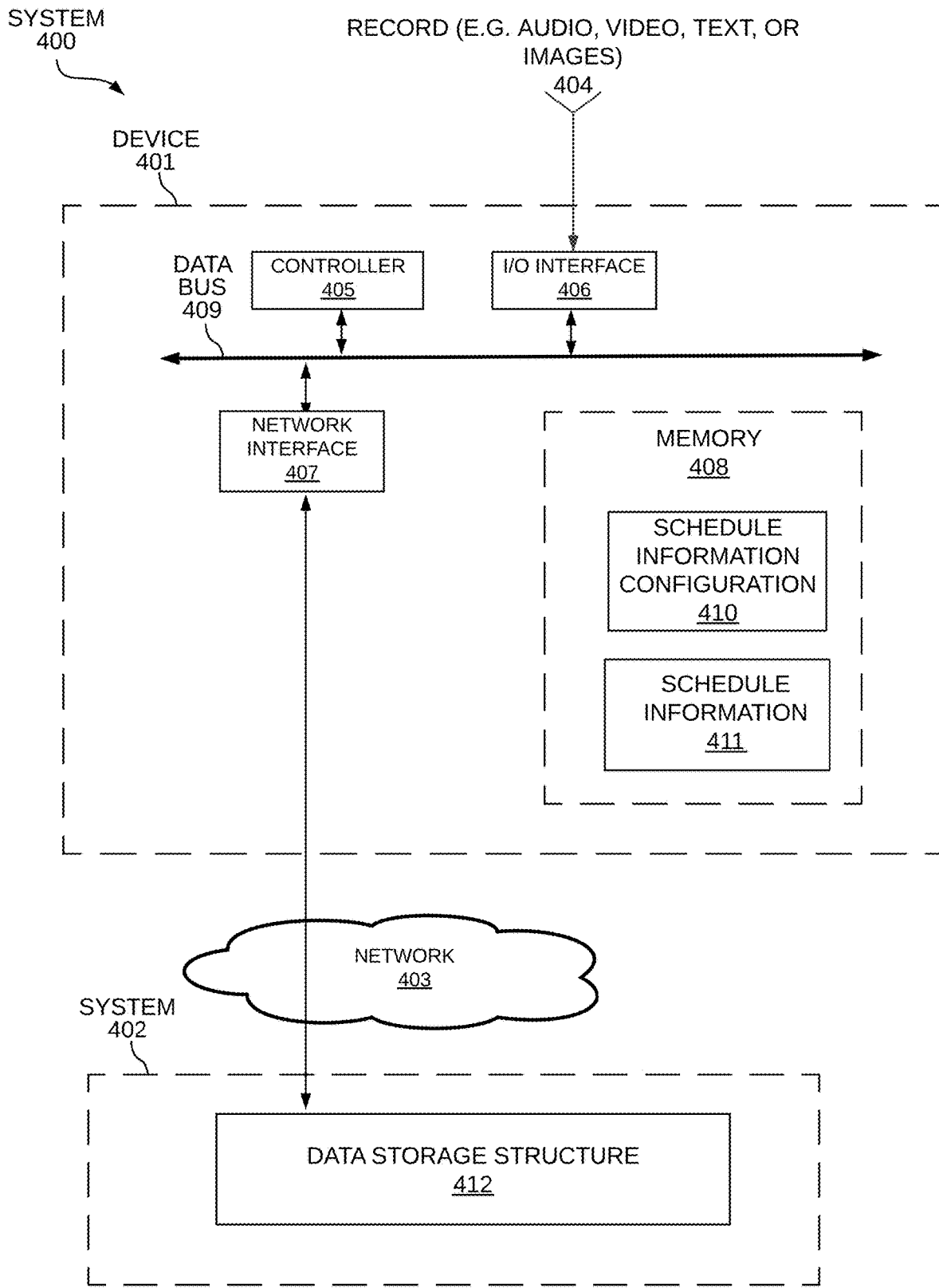
FIG. 24 is a diagram of a system 400.

FIG. 24 is a diagram of a system 400. In system 400, records are stored remotely and external to device 401. The system 400 comprises a device 401, a system 402, a network 403, and a record 404. The record 404 includes audio, video, text, images, or any other type of digital media. The device 401 comprises a controller 405, an input/output interface 406, a network interface 407, a memory 408, and a data bus 409. The memory 408 comprises a schedule information configuration 410 and a schedule information 411. The system 402 comprises a data storage structure 412. Record 404 is stored within the data storage structure 412.

Figure 25:
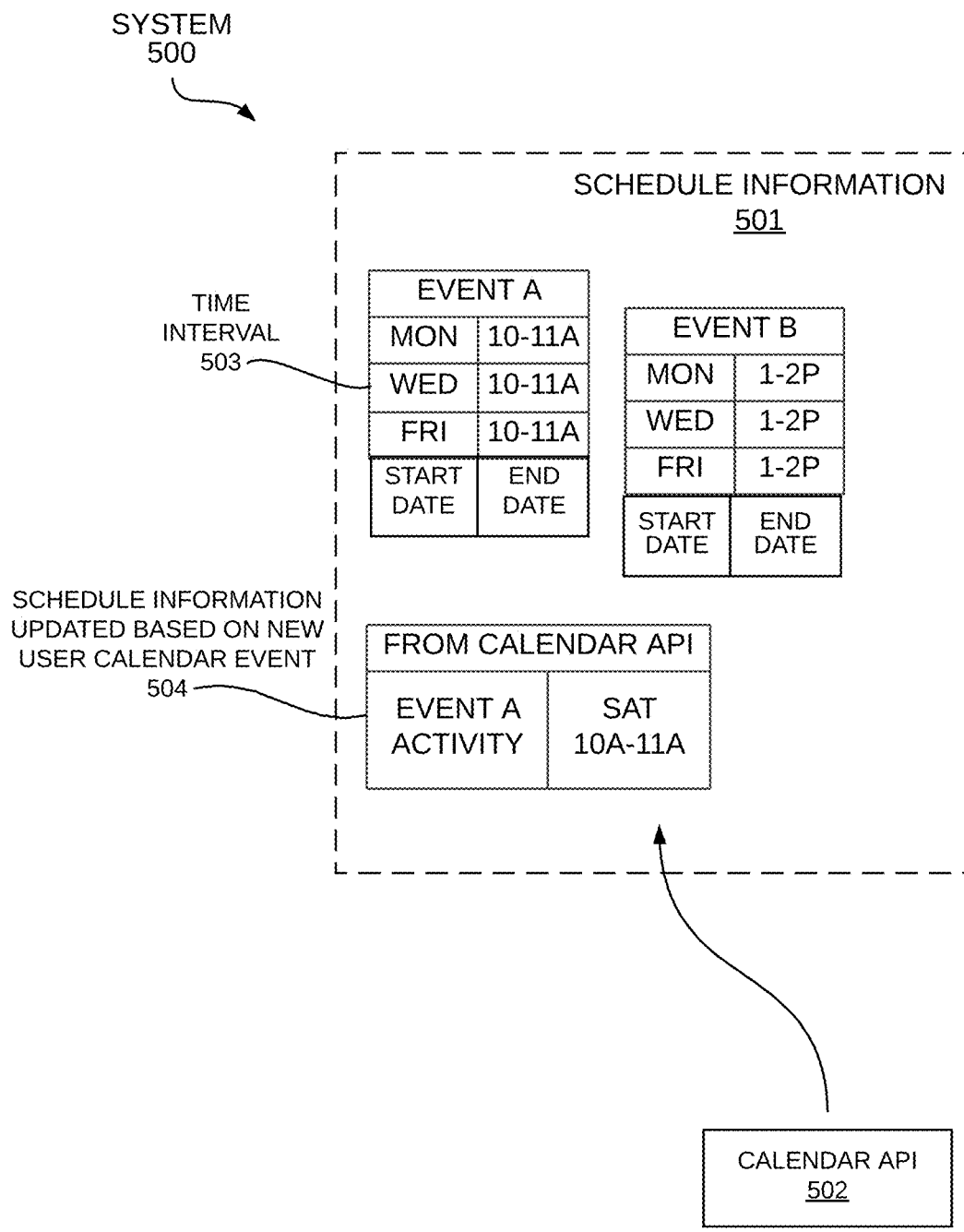
FIG. 25 is a diagram of a system 500 that uses a calendar service 502 to update schedule information 501.

FIG. 25 is a diagram of a system 500 that uses a calendar service 502 to update schedule information 501. In this example, schedule information is updated based on event information provided by a calendar service 502, such as a calendar API (Application Programming Interface).

Figure 26:
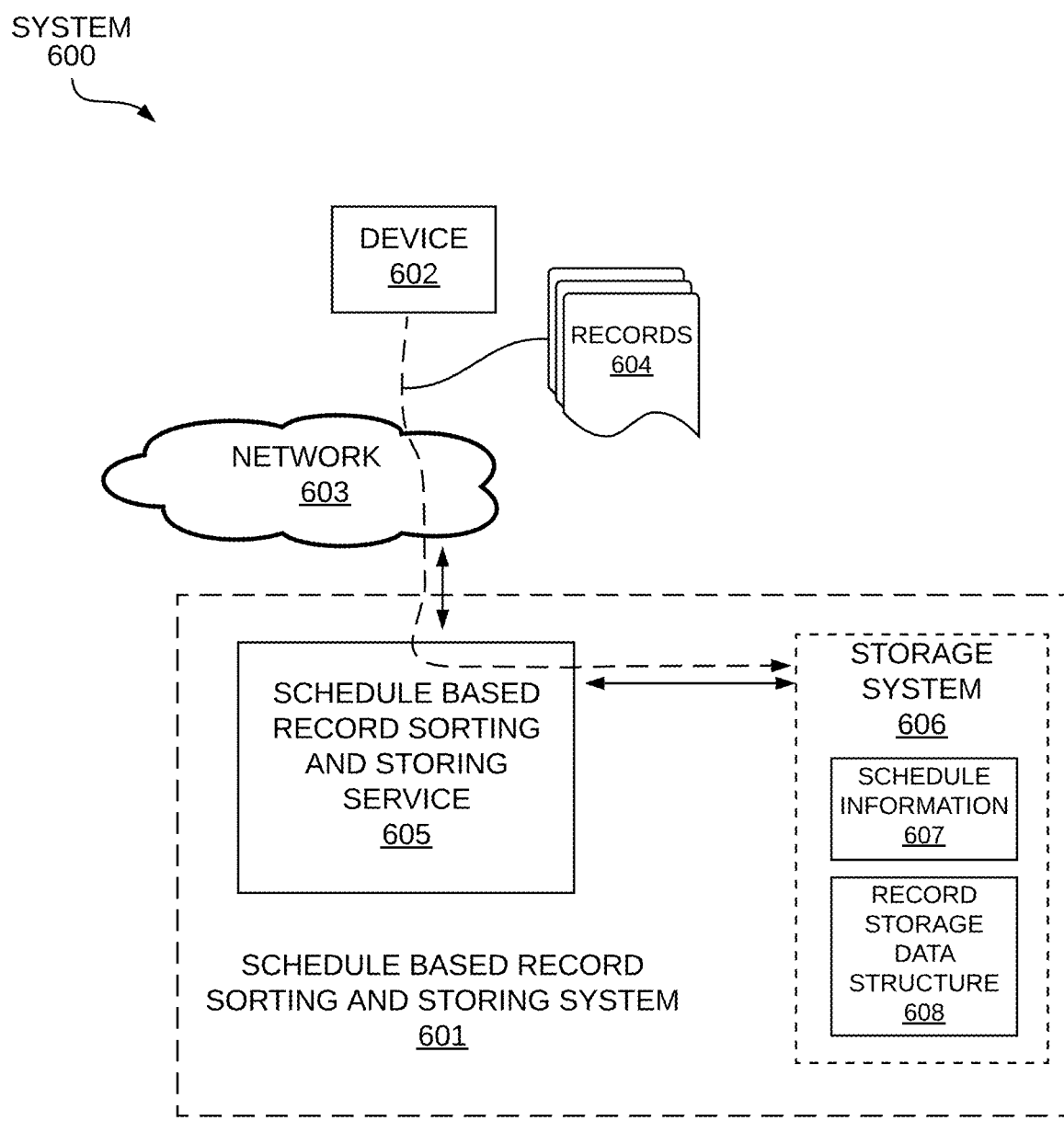
FIG. 26 is a diagram of a system 600.

FIG. 26 is a diagram of a system 600. System 600 comprises a schedule based record sorting and storing system 601, a device 602, and a network 603. The schedule based record sorting and storing system 601 comprises a schedule based record sorting and storing service 605 and a storage system 606. The storage system 606 comprises schedule information 607 and a record storage data structure 608. The schedule based record sorting and storing system 601 receives records 604 from the device 602 over network 603. The schedule based record sorting and storing system 601 sorts and stores the received records in accordance with various novel techniques described above.

In one embodiment, the schedule based record sorting and storing system 601 is an application server and the schedule based record sorting and storing service 605 and a storage system 606 are operating on the application server 601. In another embodiment, the schedule based record sorting and storing system 601 is a distributed system in which the schedule based record sorting and storing service 605 and a storage system 606 operate and communicate over a distributed network.

In operation, the device 602 registers with the schedule based record sorting and storing service 605. The device 602 provides schedule information 607 to the schedule based record sorting and storing service 605 and provides updates. The device might be a computing device pertaining to a single user or might be a server system that provides services to customers. The device provides records 604 to the schedule based record sorting and storing service 605. For each of the records 604, the schedule based record sorting and storing service 605 identifies a creation time of the record, compares the creation time to time intervals of the schedule information 607, and stores the record in the record storage data structure 608 based on the comparison.

Although certain specific embodiments are described above for instructional purposes, the teachings of this patent document have general applicability and are not limited to the specific embodiments described above. FIGS. 6-23 show one embodiment of a software application that employs various novel techniques disclosed in the present disclosure. It is appreciated that this mobile application is but one application and that the novel techniques of disclosure are applicable to other non-educational related contexts. The novel teaching can be applied in any setting where records are generated and stored for different recurring events.

It is also appreciated that various other applications of these novel techniques need not involve a mobile application. For example, in other embodiments, the novel techniques disclosed in this patent document are provided to users as a service, such as a Software as a Service (SaaS) product, that is accessible over a distributed network to a wide variety of clients. In the example of a SaaS product, users register and pay a subscription fee for use of the SaaS product. After registration, the SaaS product obtains schedule information from user input, such as through a web-based interface, from one or more calendar services (Google Calendar, Apple iCloud Calendar, Outlook.com, etc.), or from a combination of user input and one or more calendar services. In one example, the user provides calendar credentials to the SaaS product. The calendar credentials grant the SaaS product access to a user's calendar services via an API. The SaaS product reads the user's calendared events via the calendar API and attempts to identify recurring scheduled events. Based on detected recurring events, the SaaS product presents one or more scheduled recurring events to the user. The user accepts or modifies the one or more presented recurring scheduled events that were detected and optionally adds additional scheduled recurring events. The SaaS product then stores records, previously created in addition to newly generated records, using the schedule information to determine storage locations as set forth in various embodiments disclosed above. In one example, the SaaS product also includes a storage service that provides remote access to the records on any device registered with the SaaS product. Accordingly, various modifications, adaptations, and combinations of various features of the described embodiments can be practiced without departing from the scope of the invention as set forth in the claims.

What is claimed is:

1. A method comprising:
   receiving schedule information, wherein the schedule information includes one or more time intervals;
   generating a record; and
   determining a storage location for the record based on when the record was generated, wherein the storage location is determined by comparing a creation time of the record with each time interval until a matching time interval in the schedule information is found.

2. The method of claim 1, further comprising:
   storing the record at the storage location, wherein the storage location stores other records having same time intervals.

3. The method of claim 1, further comprising:
   presenting records on a display, wherein the records are grouped together based on time intervals within the schedule information.

4. The method of claim 3, wherein the records are presented on the display in response to user input.

5. The method of claim 1, wherein the schedule information includes time intervals indicating when a recurring note-taking activity is conducted, wherein the record stores notes taken during the recurring note-taking activity, and wherein each time interval of the schedule information includes a start date, an end date, and at least one recurring time and day of a week.

6. The method of claim 1, wherein the matching time interval has a start time and an end time, and wherein the creation time is within the start time and the end time, otherwise a prompt is presented to select where the record is to be stored.

7. A method comprising:
receiving schedule information, wherein the schedule information includes one or more time intervals;
generating a record; and
determining a storage location for the record based on when the record was generated, wherein the record has a creation time, wherein the storage location is determined by comparing the creation time of the record with time intervals of the schedule information, and wherein the storage location stores other records having creation times within a same recurring time interval.

8. A method comprising:
receiving schedule information, wherein the schedule information includes one or more time intervals;
generating a record; and
determining a storage location for the record based on when the record was generated, wherein the storage location is a subdirectory within a directory, and wherein the directory stores other subdirectories associated with a group of time intervals.

9. The method of claim 8, wherein the record comprises text, drawings, audio, video, images, or digital media in any file format, or a combination of text, drawings, audio, video, images, or digital media in any file format, and wherein the record is generated from user input.

10. The method of claim 8, wherein the storage location is part of a local storage system or an external storage system, and wherein the schedule information is obtained from a calendar application through an Application Programming Interface (API).

11. An apparatus comprising:
a memory that stores schedule information, wherein the schedule information includes at least one time period; and
a processor that generates a record based on user input, wherein the processor determines a storage location for the record based on when the record was generated, wherein the record has a creation time, wherein the storage location is determined by comparing the creation time of the record with time periods of the schedule information, and wherein the storage location stores other records having same time periods of the schedule information.

12. An apparatus comprising:
a memory that stores schedule information, wherein the schedule information includes at least one time period; and
a processor that generates a record based on user input, wherein the processor determines a storage location for the record based on when the record was generated, wherein the storage location is determined by comparing a creation time of the record with each time period within the schedule information until a matching time period is found.

13. The apparatus of claim 12, wherein the apparatus further comprises:
an input device used to generate the record, wherein the input device is selected from the group consisting of: keyboard input, touch input, stylus input, audio input, video sensor input, image sensor input, and other user inputs.

14. The apparatus of claim 12, wherein the apparatus further comprises:
a display, wherein the records are presented on the display grouped based on time intervals within the schedule information.

15. The apparatus of claim 12, wherein the schedule information includes time periods indicating when a scheduled recurring event is conducted, wherein the record stores notes taken during the scheduled recurring event, and wherein each time period of the schedule information includes a start date, an end date, and at least one recurring time.

16. The apparatus of claim 12, wherein the storage location is part of a local file system or an external file system.

17. An apparatus comprising:
a memory that stores schedule information, wherein the schedule information includes at least one time period; and
means for generating a record based on user input, wherein the means is also for determining a storage location for the record based on when the record was generated, wherein the storage location is a subdirectory within a directory, and wherein the directory stores other subdirectories associated with a group of time intervals.

18. The apparatus of claim 17, wherein the apparatus is a computing device, and wherein the means is a processor.

* * * * *